(12) United States Patent
Nomoto

(10) Patent No.: US 11,982,886 B2
(45) Date of Patent: May 14, 2024

(54) OPTICAL MODULATOR

(71) Applicant: HAMAMATSU PHOTONICS K.K., Hamamatsu (JP)

(72) Inventor: Yoshiro Nomoto, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 287 days.

(21) Appl. No.: 17/311,022

(22) PCT Filed: Dec. 13, 2019

(86) PCT No.: PCT/JP2019/049002
§ 371 (c)(1),
(2) Date: Jun. 4, 2021

(87) PCT Pub. No.: WO2020/137632
PCT Pub. Date: Jul. 2, 2020

(65) Prior Publication Data
US 2022/0019096 A1    Jan. 20, 2022

(30) Foreign Application Priority Data

Dec. 28, 2018 (JP) .................... 2018-246613

(51) Int. Cl.
G02F 1/01 (2006.01)
G02F 1/015 (2006.01)
G02F 1/03 (2006.01)

(52) U.S. Cl.
CPC .......... G02F 1/0126 (2013.01); G02F 1/0151 (2021.01); G02F 1/0311 (2013.01); *G02F 2201/305* (2013.01)

(58) Field of Classification Search
CPC .... G02F 1/0126; G02F 1/0151; G02F 1/0311; G02F 2201/305; G02F 1/0305; G02F 1/03

See application file for complete search history.

(56) References Cited

U.S. PATENT DOCUMENTS 6,486,996 B1 * 11/2002 Romanovsky ........ G02F 1/0551
359/322
6,525,867 B1    2/2003 Oakley et al.
(Continued)

FOREIGN PATENT DOCUMENTS

CN    1993644 A    7/2007
CN    101414092 A    4/2009
(Continued)

OTHER PUBLICATIONS

Gin, A. et al., "Active resonant subwavelength grating devices for high speed spectroscopic sensing", Proceedings of SPIE, URL: doi:10.1117/12.809645, Feb. 9, 2009, vol. 7218, 721815, pp. 1-9.
(Continued)

*Primary Examiner* — John Bedtelyon
(74) *Attorney, Agent, or Firm* — Faegre Drinker Biddle & Reath LLP

(57) ABSTRACT

A light modulator of to this embodiment enables high-speed modulation to an SLM using a liquid crystal. The light modulator comprises refractive index regions arranged in a first direction on a reference plane, a region surrounding each refractive index regions and having a refractive index lower than that of each refractive index region, a first conductive film, and a second conductive film. The first conductive film is provided on any one of a pair of side surfaces arranged in the first direction in at least one refractive index region selected from the refractive index regions and belonging to a first group. The second conductive film is provided on any one of the pair of side surfaces so as not to overlap with the first conductive film in at least one refractive index region selected from the refractive index regions and belonging to a second group.

14 Claims, 18 Drawing Sheets

(56) References Cited

U.S. PATENT DOCUMENTS 6,552,842 B2     4/2003   Simpson et al.
2016/0342282 A1   11/2016   Wassvik

FOREIGN PATENT DOCUMENTS

| CN | 102067019 A | 5/2011 |
|----|----|----|
| JP | 2001-521207 A | 11/2001 |
| JP | 2007-065458 A | 3/2007 |
| WO | WO-99/022266 A1 | 5/1999 |
| WO | WO-2017/057700 A1 | 4/2017 |

OTHER PUBLICATIONS

International Preliminary Report on Patentability dated Jul. 8, 2021 for PCT/JP2019/049002.
Kemme, S. A., et al., "Active resonant subwavelength grating for scannerless range imaging sensors," Proceedings SPIE, vol. 6469, 646906, 1-23, Feb. 9, 2007, pp. 12-19.
Okazaki, Masahide, et al., "EO Spatial UV-Light Modulator Using Periodically-Poled Deep-Proton-Exchanged s-LiTaO$_3$ Waveguide," European Conference On Integrated Optics, 2012.

\* cited by examiner

OPTICAL MODULATOR

TECHNICAL FIELD

The present invention relates to a light modulator.

BACKGROUND ART

Patent Document 1 discloses a light modulator that modulates incident light, and a light modulating device incorporating the light modulator. This light modulator is provided with an underlayer, a pattern portion, and a variable refractive index portion. The underlayer is comprised of a first refractive index material. The pattern portion is provided on the underlayer and includes a plurality of portions. The plurality of portions is comprised of a second refractive index material having a refractive index different from that of the first refractive index material and having conductivity. The variable refractive index portion is comprised of a third refractive index material having a refractive index different from that of the second refractive index material, the refractive index changing under an electric field. The variable refractive index portion fills a portion between the plurality of portions of the pattern portion. Non-Patent Document 1 discloses a light modulator that modulates UV light (wavelength of 355 nm) by utilizing the Pockels effect.

CITATION LIST

Patent Literature

Patent Document 1: International Publication No. 2017/057700

Non-Patent Literature

Non-Patent Document 1: Masahide Okazaki et al., "EO Spatial UV-Light modulator Using Periodically-Poled Deep-Proton-Exchanged s-LiTaO$_3$ Waveguide", European Conference On Integrated Optics, (2012)

SUMMARY OF INVENTION

Technical Problem

As a result of examination of the conventional light modulator, the inventors found the following problems. That is, in recent years, in the field of laser machining, microscopic observation and the like, for example, a technology of obtaining desired time waveform and condensed shape by modulating light using a spatial light modulator (SLM) has been realized. For example, as the SLM, a liquid crystal on silicon (LCOS) type SLM that modulates a phase of light in a liquid crystal layer is known. However, in such SLM using a liquid crystal, a response to an input of a control signal is slow, so that the SLM that enables high-speed modulation is desired.

The present invention has been achieved to solve the above-described problems, and an object thereof is to provide a light modulator that enables high-speed modulation as compared with the SLM using the liquid crystal.

Solution to Problem

In order to solve the above-described problems, a light modulator according to one embodiment of the present invention is provided with a plurality of refractive index regions, a first conductive film, and a second conductive film. The plurality of refractive index regions is sequentially arranged on a reference plane at a constant arrangement pitch so as to form a grating in a first direction on the reference plane. Each of the plurality of refractive index regions contains a nonlinear optical crystal and includes a pair of side surfaces sequentially arranged in the first direction in a state of intersecting with the first direction. The first conductive film is provided on any side surface out of the pair of side surfaces in one or more refractive index regions selected from the plurality of refractive index regions and belonging to a first group. Similarly, the second conductive film is provided on any side surface out of the pair of side surfaces so as not to overlap with the first conductive film in one or more refractive index regions selected from the plurality of refractive index regions and belonging to a second group. Furthermore, each of the plurality of refractive index regions is surrounded by a region having a refractive index lower than a refractive index of each of the plurality of refractive index regions.

Advantageous Effects of Invention

A light modulator according to one embodiment of the present invention enables high-speed modulation as compared with an SLM using a liquid crystal.

DESCRIPTION OF EMBODIMENTS

Figure 1:
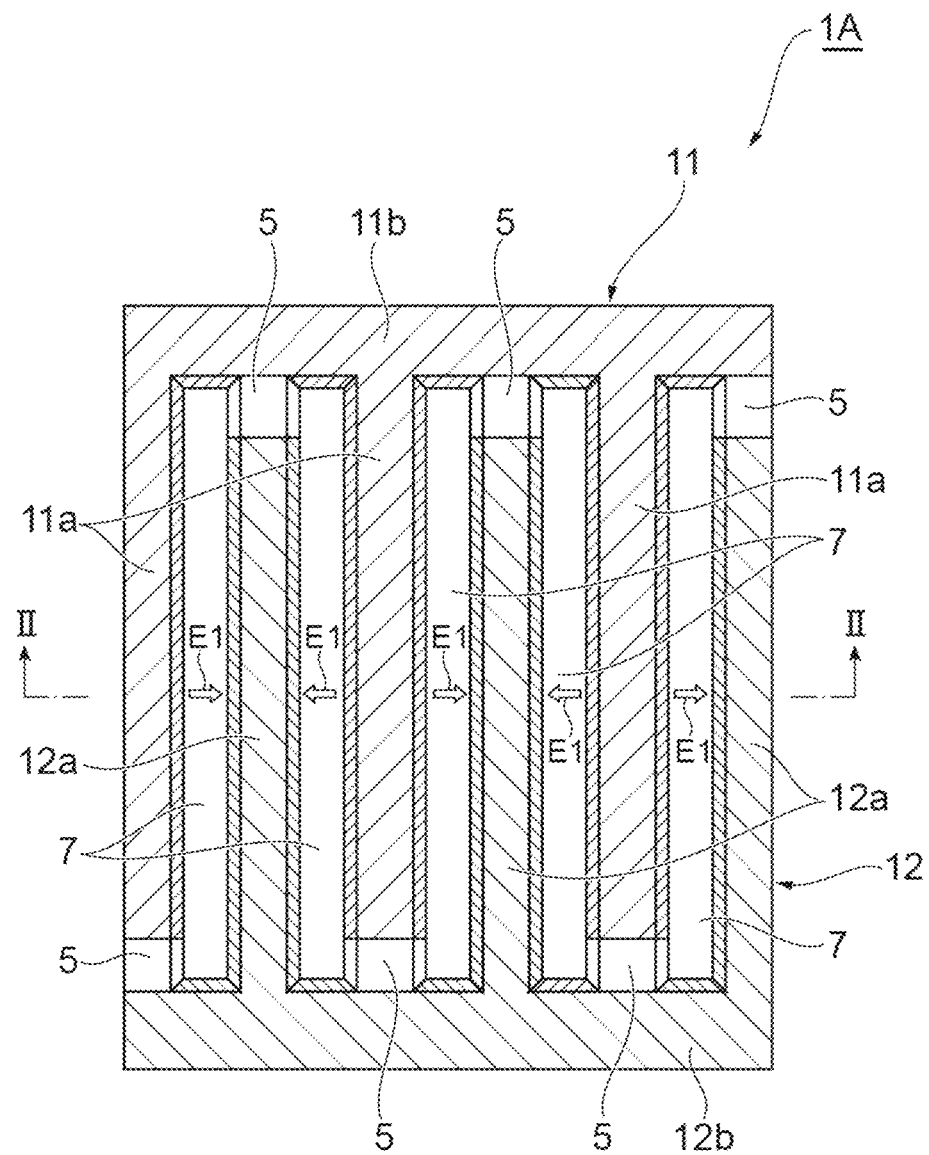
FIG. 1 is a plan view illustrating a light modulator 1A according to this embodiment.
Figure 1:
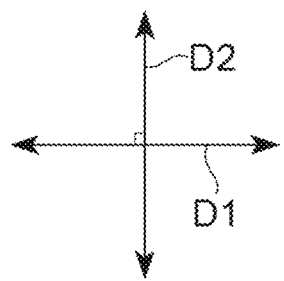

Description of Embodiments of Invention of Present Application

First, the contents of embodiments of the invention of the present application are listed and described individually.

(1) A light modulator according to this embodiment is provided with a plurality of refractive index regions (a plurality of first refractive index regions), a first conductive film, and a second conductive film as one aspect thereof. The plurality of refractive index regions is sequentially arranged on a reference plane at a constant arrangement pitch so as to form a grating in a first direction on the reference plane (adjacent refractive index regions are separated from each other). Each of the plurality of refractive index regions contains a nonlinear optical crystal and includes a pair of side surfaces sequentially arranged in the first direction in a state of intersecting with the first direction. The first conductive film is provided on any side surface out of the pair of side surfaces in one or more refractive index regions selected from the plurality of refractive index regions and belonging to a first group. Similarly, the second conductive film is provided on any side surface out of the pair of side surfaces so as not to overlap with the first conductive film in one or more refractive index regions selected from the plurality of refractive index regions and belonging to a second group. That is, one continuous conductive film is not provided on both of the pair of side surfaces at the same time. Furthermore, each of the plurality of refractive index regions is surrounded by a region having a refractive index lower than a refractive index of each of the plurality of refractive index regions.

When light is incident on the light modulator having the above-described structure in a thickness direction (a second direction orthogonal to the reference plane), a high reflectance is obtained for light in a narrow wavelength range corresponding to the arrangement pitch of the plurality of refractive index regions in addition to the refractive index and thickness of each of the plurality of refractive index regions. When a voltage is applied between the first conductive film and the second conductive film, the refractive index of the plurality of refractive index regions changes according to magnitude of the voltage by an electro-optical effect in the nonlinear optical crystal. That is, the wavelength range in which the high reflectance is obtained shifts according to the magnitude of the voltage. Looking at a certain wavelength, the reflectance changes according to the magnitude of the applied voltage. Therefore, intensity of emission light may be arbitrarily modulated with respect to intensity of the incident light (that is, a light intensity modulator may be realized). This modulation action is realized by the electro-optical effect of a solid nonlinear optical crystal; a response of the nonlinear optical crystal to an input of a voltage signal is remarkably faster than a response of a liquid crystal. That is, in the light modulator according to this embodiment having the above-described structure, a response to an input of a control signal is faster than that in an SLM using a liquid crystal and high-speed modulation becomes possible.

Since resistance of the liquid crystal to high-energy light such as ultraviolet light is low, for example, in a case of the SLM using the liquid crystal, practical use is limited to a wavelength range of 400 nm or longer, for example. On the other hand, resistance of the nonlinear optical crystal to high-energy light such as ultraviolet light is remarkably higher than that of the liquid crystal. Therefore, according to this embodiment, the light modulator especially useful for high energy light such as ultraviolet light may be provided. Especially, a wavelength of 355 nm corresponds to a third harmonic of a YAG laser, and is considered to be extremely useful for laser machining application of carbon fiber reinforced plastics (CFRP). CFRP is a material use of which in the automobile industry, the aerospace industry and the like is expanding, for example, and it is considered to be desirable to machine CFRP with ultraviolet light in the future.

(2) Note that, as one aspect of this embodiment, at least one refractive index region out of the refractive index regions belonging to the first group shall also belong to the second group. As one aspect of this embodiment, in each of the plurality of refractive index regions, the first conductive film may be provided on one of the pair of side surfaces, and the second conductive film may be provided on the other of the pair of side surfaces.

That is, the first group is a group to which the refractive index region in which the first conductive film is provided on any side surface out of the pair of side surfaces belongs. The second group is a group to which the refractive index region in which the second conductive film is provided on any side surface out of the pair of side surfaces so as not to overlap with the first conductive film belongs. Therefore, in the refractive index region belonging to both the first and second groups, the first conductive film is provided on one of the pair of side surfaces thereof, and the second conductive film is provided on the other (the first and second conductive films are not arranged in an overlapping manner). Conversely, neither the first nor the second conductive film is provided on the pair of side surfaces of the refractive index region that does not belong to either the first or the second group. All of the plurality of refractive index regions may belong to both the first and second groups (the first and second conductive films are provided on the side surfaces of the plurality of refractive index regions so as not to overlap with each other).

(3) As one aspect of this embodiment, a material having a refractive index lower than the refractive index of each of the plurality of refractive index regions is preferably embedded in the region surrounding each of the plurality of refractive index regions. With such a configuration, a low refractive index region may be arranged in a part of the periphery of the plurality of refractive index regions. By filling a gap between the plurality of refractive index regions, it is possible to enhance mechanical strength of the light modulator.

(4) As one aspect of this embodiment, the light modulator may further be provided with a low refractive index layer in contact with the plurality of refractive index regions so as to sandwich a reference plane. In this case, the low refractive index layer has a refractive index lower than the refractive index of each of the plurality of refractive index regions. Even with such a configuration, it becomes possible to arrange the low refractive index region in a part of the periphery of the plurality of refractive index regions. The presence of such low refractive index layer makes it easy to form the plurality of refractive index regions on the layer.

(5) As one aspect of this embodiment, in two refractive index regions adjacent to each other in the first direction out of the plurality of refractive index regions, one of the first and second conductive films may be continuously provided on the side surfaces facing each other of the two adjacent refractive index regions and a part of the low refractive index layer located between the side surfaces facing each other. Such a configuration facilitates formation of the first and second conductive films.

(6) As one aspect of this embodiment, the light modulator may further be provided with a light reflecting layer provided in a state separated from the plurality of refractive index regions in a second direction orthogonal to the reference plane in a space on a side opposite to the plurality of refractive index regions across the reference plane. In this case, the region surrounding the plurality of refractive index regions (including a region between the plurality of refractive index regions and the light reflecting layer) has a refractive index lower than that of the plurality of refractive index regions. Therefore, a resonator structure is formed between the plurality of refractive index regions and the light reflecting layer, and a light reflectance of the plurality of refractive index regions serving as the other light reflecting layer is variable by the voltage application to the first and second conductive films as described above. By such a non-equilibrium Fabry-Perot resonator structure, the light incident on the light modulator is emitted from the light modulator in a phase corresponding to magnitude of the voltage applied to the first and second conductive films. In this manner, according to the light modulator according to this embodiment, it becomes possible to modulate the phase of the incident light to arbitrary magnitude (that is, a light phase modulator may be realized). In the light phase modulator having such structure also, a response to an input of a control signal is faster than that in a SLM using the liquid crystal and high-speed modulation becomes possible.

(7) As one aspect of this embodiment, the light reflecting layer preferably includes a metal film or a dielectric multi-layer film. In this case, it becomes possible to easily realize the light reflecting layer having a high reflectance.

(8) As one aspect of this embodiment, an optical distance (defined in the second direction) between the light reflecting layer and the plurality of refractive index regions preferably is an integral multiple of ¼ of a wavelength of incident light. In this case, since a phase change accompanying a change in applied voltage becomes steep, a phase modulation width may be further expanded. For example, phase modulation with a width of $2\pi$ (rad) is also possible.

(9) As one aspect of this embodiment, the nonlinear optical crystal preferably contains at least one of lithium niobate and lithium tantalate. For example, when the nonlinear optical crystal contains these materials, the action of the light modulator as described above is preferably obtained. Furthermore, as one aspect of this embodiment, the nonlinear optical crystal may include at least any of cesium lithium borate CLBO ($CsLiB_6O_{10}$), β-barium borate BBO (β-$BaB_2O_4$), and lithium borate LBO ($LiB_3O_5$).

(10) As one aspect of this embodiment, each of the first conductive film and the second conductive film preferably has light transmittance. In this case, it is possible to reduce optical loss in each of the first conductive film and the second conductive film. That is, improvement in light incidence/emission efficiency of the light modulator may be expected.

As described above, each aspect listed in this [Description of Embodiment of Invention of Present Application] is applicable to each of all the remaining aspects or all the combinations of the remaining aspects.

Embodiments of Invention of Present Application in Detail

A specific structure of a light modulator according to this embodiment is hereinafter described in detail with reference to the attached drawings. Note that the present invention is not limited to these illustrations but recited in claims, and it is intended that equivalents of claims and all modifications within the scope are included. In the description of the drawings, the same reference sign is assigned to the same element and the description thereof is not repeated.

Figure 2:
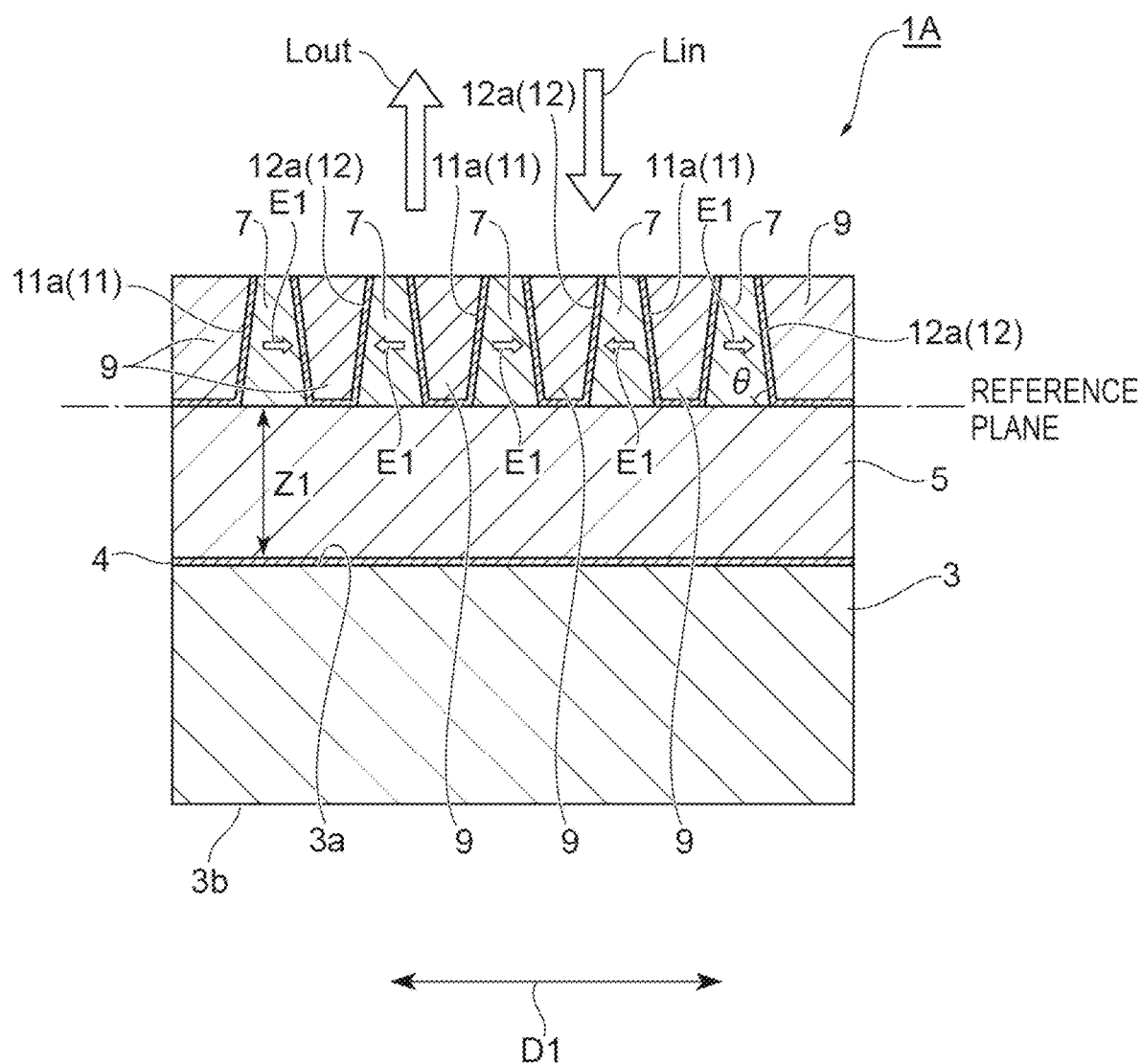
FIG. 2 is a cross-sectional view of the light modulator 1A taken along line II-II in FIG. 1.

FIG. 1 is a plan view illustrating a light modulator 1A according to this embodiment. FIG. 2 is a cross-sectional view of the light modulator 1A taken along line II-II in FIG. 1. In FIG. 1, a second refractive index region 9 illustrated in FIG. 2 is not illustrated for easier understanding. As illustrated in FIGS. 1 and 2, the light modulator 1A of this embodiment is provided with a substrate 3, a light reflecting layer 4, a low refractive index layer 5, a plurality of first refractive index regions 7, a plurality of second refractive index regions 9 (regions surrounding the plurality of first refractive index regions 7, respectively), a first conductive film 11, and a second conductive film 12.

The substrate 3 is a flat plate-shaped member including a flat main surface 3a and a flat rear surface 3b opposing the main surface 3a. The main surface 3a and the rear surface 3b are parallel to each other. The substrate 3 mainly contains, for example, a nonlinear optical crystal or an inorganic material other than the nonlinear optical crystal. In one example, the substrate 3 is comprised of the nonlinear optical crystal or the inorganic material other than the nonlinear optical crystal. As the nonlinear optical crystal, there is, for example, at least one of lithium niobate ($LiNbO_3$) and lithium tantalate ($LiTaO_3$). Furthermore, examples of the nonlinear optical crystal may include cesium lithium borate CLBO ($CsLiB_6O_{10}$), β-barium borate BBO (β-$BaB_2O_4$), and lithium borate LBO ($LiB_3O_5$). As the inorganic material other than the nonlinear optical crystal, there is, for example, silicon (Si). A thickness of the substrate 3 (a distance between the main surface 3a and the rear surface 3b) is, for example, within a range of 400 to 1000 μm.

The light reflecting layer 4 is provided in a case where the light modulator 1A is used as a light phase modulator and is not provided in a case where the light modulator 1A is used as a light intensity modulator. In a case where the light reflecting layer 4 is provided, the light reflecting layer 4 is provided on the main surface 3a of the substrate 3 in a state separated from the plurality of first refractive index regions 7 to be described later by an optical distance Z1 in a thickness direction (a second direction orthogonal to the reference plane). A suitable optical distance between the light reflecting layer 4 and the plurality of first refractive index regions 7 is an integral multiple of ¼ of a wavelength of incident light. In one example, the light reflecting layer 4 is in contact with the main surface 3a of the substrate 3. The light reflecting layer 4 is formed of, for example, a metal film, and in one example, this is an aluminum (Al) film. In this case, a thickness of the light reflecting layer 4 is within a range of 10 to 150 nm, for example. Note that the light reflecting layer 4 may have a multilayer metal structure of Cr (10 to 100 nm)/Au (10 nm to 150 nm)/Cr (10 to 100 nm) from a substrate 3 side. Furthermore, the light reflecting layer 4 may be formed of a dielectric multilayer film. The dielectric multilayer film is obtained by alternately stacking $SiO_2$ and $HfO_2$, for example. In this case, an optical film thickness of each layer of the light reflecting layer 4 is an integral multiple of ¼ of the wavelength of the incident light, and the number of layers is, for example, 20 or larger.

The low refractive index layer 5 is provided between the plurality of first refractive index regions 7 and the light reflecting layer 4 (or between the plurality of first refractive index regions 7 and the substrate 3) on the main surface 3a of the substrate 3. A surface on a side opposite to a surface located on the substrate 3 side of the low refractive index layer 5 is in contact with the plurality of first refractive index regions 7. In one example, the surface located on the substrate 3 side of the low refractive index layer 5 is in contact with the light reflecting layer 4. In this case, the optical distance Z1 between the plurality of first refractive index regions 7 and the light reflecting layer 4 is defined by an optical film thickness of the low refractive index layer 5. A material forming the low refractive index layer 5 has an insulating property and has a refractive index lower than a refractive index of a material forming the plurality of first refractive index regions 7. The low refractive index layer 5 mainly contains an inorganic material other than a nonlinear optical crystal. In one example, the low refractive index layer 5 is comprised of the inorganic material other than the nonlinear optical crystal. As the inorganic material other than the nonlinear optical crystal, there is, for example, an insulating inorganic silicon compound such as $SiO_2$ and SiN. The optical film thickness of the low refractive index layer 5 is desirably, for example, an integral multiple of ¼ of the wavelength of the incident light.

Each of the plurality of first refractive index regions 7 is provided on the low refractive index layer 5. Therefore, in the example in FIGS. 1 and 2, an upper surface (the surface on the side opposite to the surface located on the substrate 3 side) of the low refractive index layer 5 coincides with a reference plane. The plurality of first refractive index regions 7 is arranged at a predetermined arrangement pitch in a predetermined direction D1 (coinciding with the first direction on the reference plane). The predetermined direction D1 is a direction along the main surface 3a of the substrate 3, and in one example, a direction parallel to the main surface 3a of the substrate 3. Each first refractive index region 7 has an insulating property and contains a nonlinear optical crystal. In one example, each first refractive index region 7 is comprised of the nonlinear optical crystal. As the nonlinear optical crystal, there is, for example, at least one of $LiNbO_3$ and $LiTaO_3$. Furthermore, as examples of the nonlinear optical crystal, CLBO ($CsLiB_6O_{10}$), BBO ($\beta$-$BaB_2O_4$), LBO ($LiB_3O_5$) and the like may be applied.

The plurality of first refractive index regions 7 is surrounded by a region having a refractive index lower than the refractive index of each of the plurality of first refractive index regions 7. That is, the low refractive index layer 5 is arranged below each first refractive index region 7 (substrate 3 side), and a side surface of each first refractive index region 7 is surrounded by the second refractive index region 9 to be described later. The atmosphere exists above each first refractive index region 7 (a side opposite to the substrate 3), and a refractive index of the atmosphere is smaller than the refractive index of the first refractive index region 7. Note that, although an upper surface of each first refractive index region 7 is exposed to the atmosphere in this embodiment, the upper surface of each first refractive index region 7 may also be covered with a protective film such as an inorganic silicon compound film.

As illustrated in FIG. 1, each first refractive index region 7 has a planar shape a longitudinal direction of which is a direction D2 intersecting with (for example, orthogonal to) the predetermined direction D1. In other words, the plurality of first refractive index regions 7 is arranged at predetermined intervals in a lateral direction thereof. The arrangement pitch of the plurality of first refractive index regions 7 (the sum of a width of one first refractive index region in the predetermined direction D1 and a distance to another first refractive index region adjacent thereto) is, for example, within a range of 150 to 800 nm, and this corresponds to a cycle serving as a sub-wavelength grating with respect to a wavelength of incident light Lin. As illustrated in FIG. 2, a cross-section in a thickness direction of each first refractive index region 7 has a trapezoidal shape a long side of which is on a low refractive index layer 5 side. Therefore, each side surface of each first refractive index region 7 is inclined with respect to the thickness direction of each first refractive index region 7. Then, the width in the predetermined direction D1 of each first refractive index region 7 gradually increases as is closer to the low refractive index layer 5, and an interval between facing side surfaces of the adjacent first refractive index regions 7 gradually increases as is farther from the low refractive index layer 5.

Note that the cross-section in the thickness direction of each first refractive index region 7 is not limited to the trapezoidal shape, and may be, for example, a rectangular shape and the like. In a case where the cross-sectional shape of the first refractive index region 7 is the rectangular shape, each side surface of each first refractive index region 7 is in the thickness direction of each first refractive index region 7. The width in the predetermined direction D1 of each first refractive index region 7 is uniform in the thickness direction, and the interval between the facing side surfaces of the adjacent first refractive index regions 7 is also uniform in the thickness direction. The plurality of first refractive index regions 7 may be connected to each other via a film-shaped portion containing the nonlinear optical crystal formed on the low refractive index layer 5.

A thickness of each first refractive index region 7 (that is, a height in the second direction from the surface on the low refractive index layer 5 side) is, for example, within a range of 50 nm to 1 μm. The width in the predetermined direction D1 of each first refractive index region 7 is, for example, within a range of 150 to 800 nm. A length in the direction D2 is, for example, within a range of 5 to 20 μm. An inclination angle θ of the side surface of each first refractive index region 7 with respect to the upper surface of the low refractive index layer 5 is, for example, within a range of 70 to 90 degrees.

The first conductive film 11 and the second conductive film 12 are electrodes having light transmittance. As a conductive material having light transmittance, there is, for example, a zinc oxide (ZnO)-based conductive material (for example, AZO obtained by doping Al to ZnO), ITO and the like. The first conductive film 11 is provided on one side surface (first side surface) intersecting with the predetermined direction D1 out of the side surfaces of each first refractive index region 7, and the second conductive film 12 is provided on the side surface (second side surface) on a side opposite to the one side surface.

Specifically, the first conductive film 11 has a comb-teeth-shaped planar shape as illustrated in FIG. 1, and includes a plurality of voltage applying units 11a and a connection unit 11b that connects the plurality of voltage applying units 11a to each other. The plurality of voltage applying units 11a is portions provided in gaps between the first refractive index regions 7 adjacent to each other and has a shape a longitudinal direction of which is in the direction D2. As illustrated in FIG. 2, each voltage applying unit 11a of this embodiment is continuously provided from a portion on the side surface of one first refractive index region 7 out of the first refractive index regions 7 adjacent to each other through a portion on the low refractive index layer 5 to a portion on the side surface of the other first refractive index region 7. The connection unit 11b is arranged on one side out of both ends of each first refractive index region 7 (portions including a surface intersecting with the direction D2) on the low refractive index layer 5, and extends in the predetermined direction D1 on the low refractive index layer 5. The connection unit 11b is connected to one ends of the plurality of voltage applying units 11a. A voltage signal is given to each voltage applying unit 11a from the outside of the light modulator 1A via the connection unit 11b.

The second conductive film 12 also has a comb-teeth-shaped planar shape, and includes a plurality of voltage applying units 12a and a connection unit 12b that connects the plurality of voltage applying units 12a to each other. The plurality of voltage applying units 12a is portions provided in gaps between the first refractive index regions 7 adjacent to each other and has a shape a longitudinal direction of which is in the direction D2. As illustrated in FIG. 2, each voltage applying unit 12a of this embodiment is continuously provided from a portion on the side surface of one first refractive index region 7 out of the first refractive index regions 7 adjacent to each other through a portion on the low refractive index layer 5 to a portion on the side surface of the other first refractive index region 7. The connection unit 12b is arranged on the other side out of both ends of each first refractive index region 7 (portions including a surface intersecting with the direction D2) on the low refractive index layer 5, and extends in the predetermined direction D1 on the low refractive index layer 5. The connection unit 12b is connected to one ends of the plurality of voltage applying units 12a. A voltage signal is given to each voltage applying unit 12a from the outside of the light modulator 1A via the connection unit 12b.

As illustrated in FIG. 1, a gap is provided between each voltage applying unit 11a of the first conductive film 11 and the connection unit 12b of the second conductive film 12 for electrically separating them from each other. Similarly, a gap is provided between each voltage applying unit 12a of the second conductive film 12 and the connection unit 11b of the first conductive film 11 for electrically separating them from each other.

In each first refractive index region 7, an electric field E1 in the predetermined direction D1 is formed by a voltage applied between the connection unit 11b of the first conductive film 11 and the connection unit 12b of the second conductive film 12. Since the connection unit 11b of the first conductive film 11 and the connection unit 12b of the second conductive film 12 are alternately arranged in the predetermined direction D1, directions of the electric fields E1 of the first refractive index regions 7 adjacent to each other are opposite to each other.

Each of the plurality of second refractive index regions 9 fills a region between the plurality of first refractive index regions 7. More specifically, each second refractive index region 9 is provided on the first conductive film 11 and the second conductive film 12 and covers the first conductive film 11 and the second conductive film 12. Then, upper surface of each second refractive index region 9 (a surface on the side opposite to the substrate 3) and the upper surface of each first refractive index region 7 are flush with each other and form one flat surface. A material forming each second refractive index region 9 has an insulating property and has a refractive index lower than the refractive index of the material forming each first refractive index region 7. Each second refractive index region 9 mainly contains an inorganic material other than a nonlinear optical crystal. In one example, each second refractive index region 9 is comprised of the inorganic material other than the nonlinear optical crystal. As the inorganic material other than the nonlinear optical crystal, there is, for example, an inorganic silicon compound such as $SiO_2$ or SiN.

An operation of the light modulator 1A of this embodiment having the above-described structure is described. In the light modulator 1A, the plurality of first refractive index regions 7 is arranged in the predetermined direction D1 at regular intervals, and the periphery thereof is surrounded by a low refractive index region. That is, the plurality of first refractive index regions 7 forms a grating (diffraction grating) in the predetermined direction D1. When the light Lin is incident on such light modulator 1A in a thickness direction (a direction intersecting with the predetermined direction D1, a direction substantially orthogonal to the reference plane in the example of FIG. 2), a high reflectance is selectively obtained for the light Lin in a narrow wavelength range corresponding to the refractive index, thickness, and arrangement pitch of the first refractive index region 7.

Figures 3A, 3B:
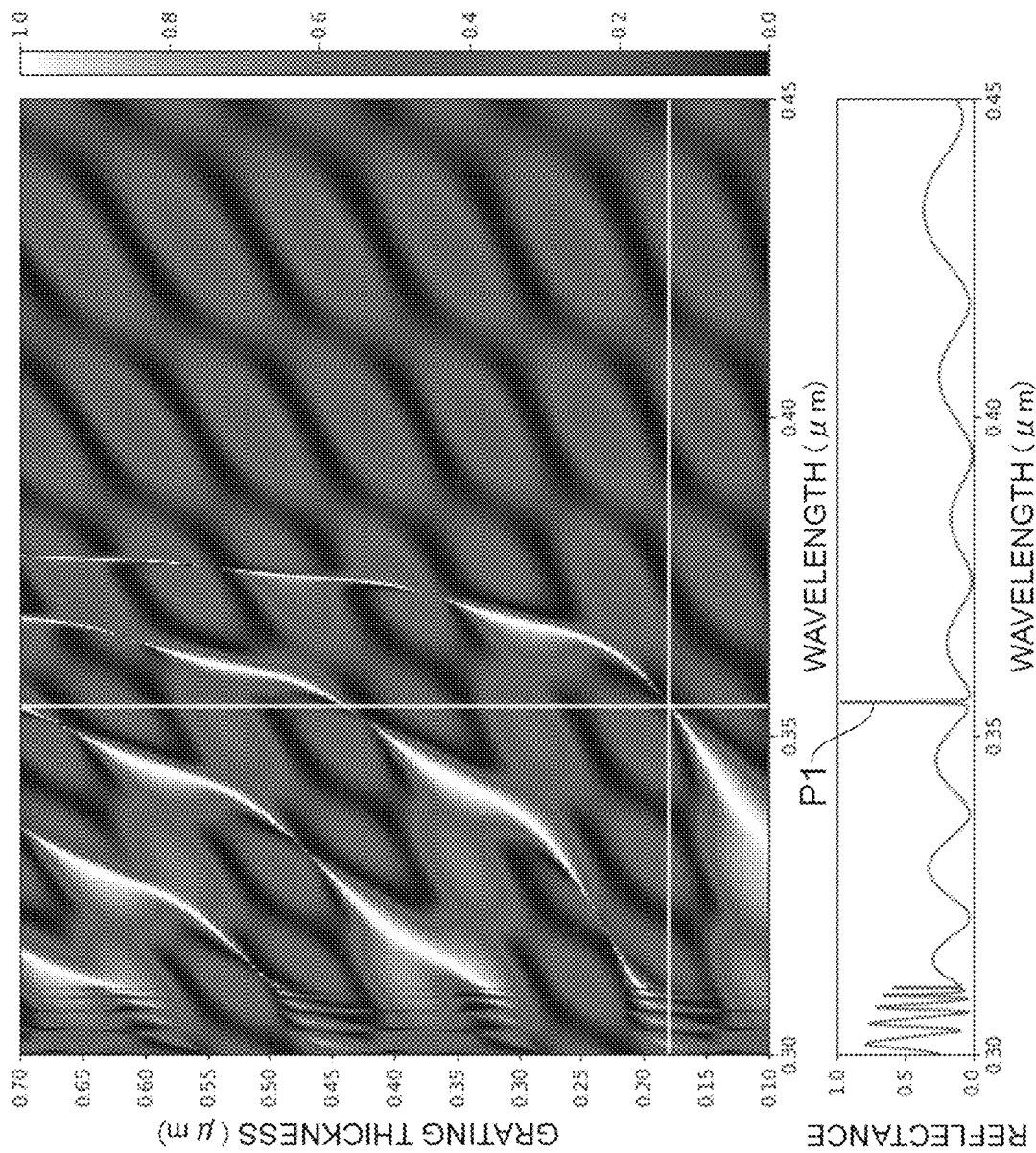
FIGS. 3A and 3B are graphs illustrating examples of a reflection characteristic of the light modulator 1A by a plurality of first refractive index regions 7.
Figures 4A, 4B:
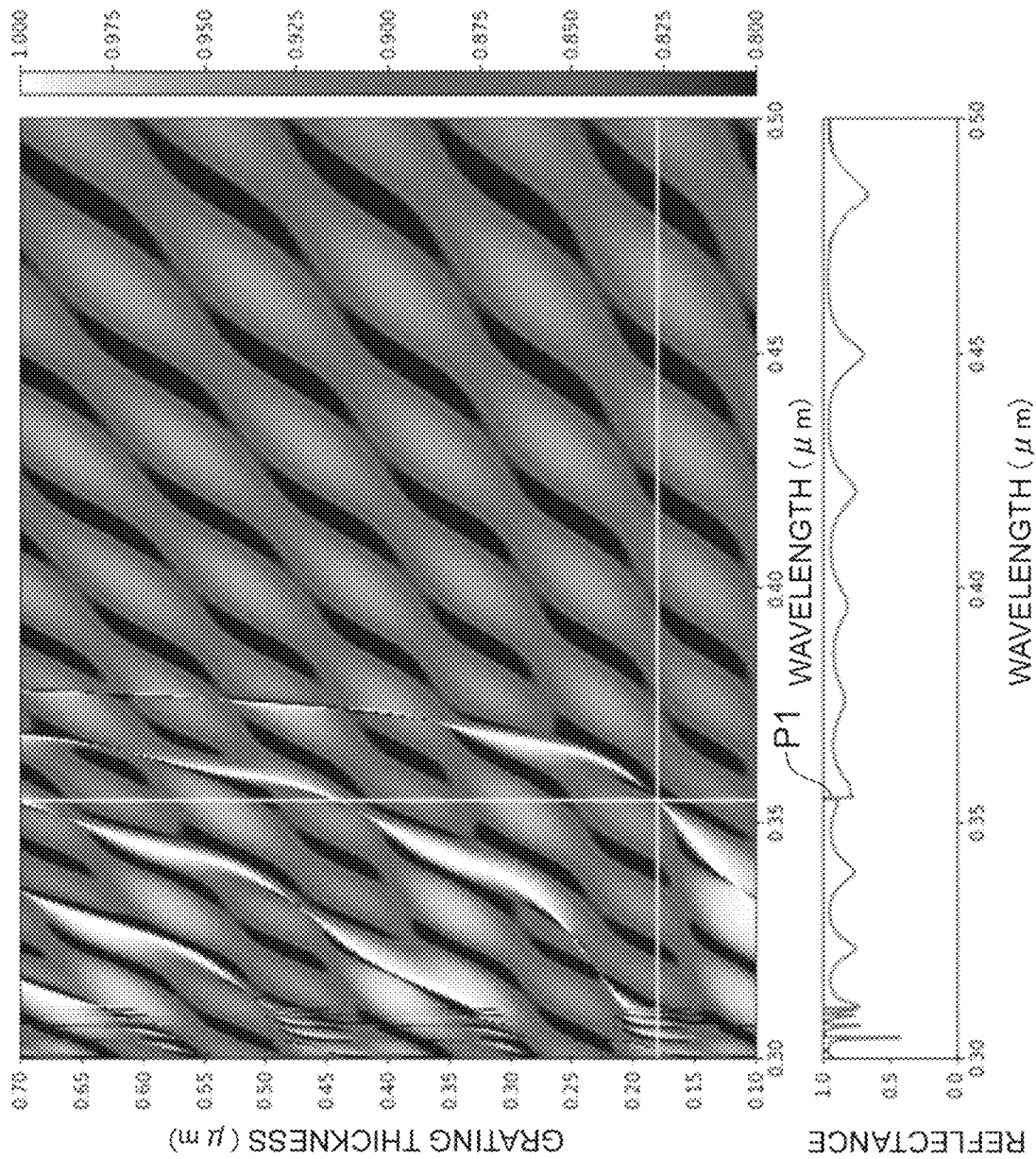
FIGS. 4A and 4B are graphs illustrating examples of the reflection characteristic of the light modulator 1A by the plurality of first refractive index regions 7.

FIGS. 3A and 3B are graphs illustrating an example of a reflection characteristic of the light modulator 1A by the plurality of first refractive index regions 7 in a case where the light modulator 1A is the light intensity modulator (that is, a case where the light reflecting layer 4 is not provided). FIGS. 4A and 4B are graphs illustrating an example of a reflection characteristic of the light modulator 1A by the plurality of first refractive index regions 7 in a case where the light modulator 1A is the light phase modulator (that is, a case where the light reflecting layer 4 is provided). In these graphs, the wavelength (μm) is plotted along the abscissa, and the thickness of each first refractive index region 7 (indicated as "grating thickness (μm)" in the drawing) is plotted along the ordinate. Note that, in these graphs, the arrangement pitch of the plurality of first refractive index regions 7 is 216 nm, and a filling rate (duty ratio) of the first refractive index region 7 in a layer constituted by the first refractive index region 7 and the second refractive index region 9 is 70%. It is assumed that a polarization direction of the incident light Lin is TE (that is, the polarization direction in the direction D2), and the incident light Lin is incident in a direction perpendicular to the main surface 3a of the substrate 3. With reference to FIGS. 3A to 4B, it is understood that a peak waveform P1 with a narrow half-value width and a high reflectance is generated when the thickness of the first refractive index region 7 is about 180 nm and the wavelength of the incident light Lin is 355 nm (position in which two white lines intersect with each other illustrated in FIGS. 3A and 4A). A wavelength range of such peak waveform P1 is referred to as a High-Q characteristic region. By this High-Q characteristic, the incident light Lin is strongly confined in the first refractive index region 7.

Figure 5:
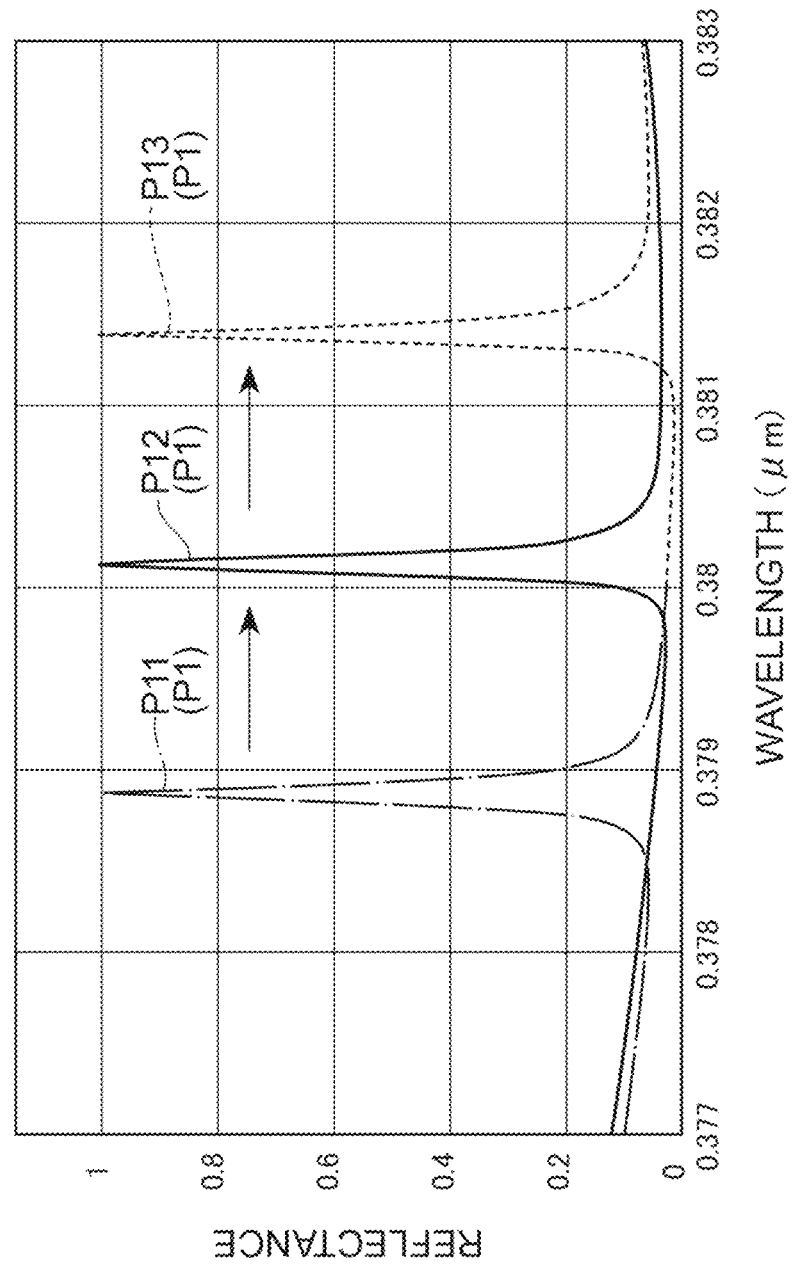
FIG. 5 is a graph for illustrating a phenomenon that a wavelength range of a peak waveform P1 shifts according to magnitude of a voltage.

When a voltage is applied between the first conductive film 11 and the second conductive film 12, the refractive index of the plurality of first refractive index regions 7 changes according to magnitude of the voltage by an electro-optical effect (Pockels effect) in the nonlinear optical crystal. That is, the wavelength range of the peak waveform P1 shifts according to the magnitude of the voltage. FIG. 5 is a graph for illustrating such a phenomenon. In FIG. 5, the reflectance is plotted along the ordinate and the wavelength (µm) is plotted along the abscissa. When the voltage applied between the first conductive film 11 and the second conductive film 12 is gradually increased, the peak waveform P1 gradually changes from a position P11 in FIG. 5 to positions P12 and P13. That is, when the wavelength of the incident light Lin is fixed, the reflectance continuously changes according to the magnitude of the applied voltage. Therefore, in a case where the light modulator 1A is the light intensity modulator (that is, in a case where the light reflecting layer 4 is not provided), intensity of reflected light (that is, emission light Lout) changes according to the magnitude of the applied voltage. Therefore, by controlling the applied voltage, the intensity of the emission light Lout may be arbitrarily modulated. Then, by arranging such light modulators 1A in a two-dimensional manner, an intensity modulation type spatial light modulator (SLM) is realized.

On the other hand, in a case where the light modulator 1A is the light phase modulator, the light reflecting layer 4 is provided in a state separated from the plurality of first refractive index regions 7 by the optical distance Z1 in the thickness direction of the plurality of first refractive index regions 7. Then, the region surrounding the plurality of first refractive index regions 7 (including the region between the plurality of first refractive index regions 7 and the light reflecting layer 4, that is, the low refractive index layer 5) has a refractive index lower than the refractive index of the plurality of first refractive index regions 7. Therefore, a resonator structure is formed between the plurality of first refractive index regions 7 and the light reflecting layer 4. In addition, the light reflectance of the plurality of first refractive index regions 7 serving as the other light reflecting layer is variable by the voltage application to the first conductive film 11 and the second conductive film 12 as described above. By such a non-equilibrium Fabry-Perot resonator structure, the light Lin incident on the light modulator 1A is modulated in a phase corresponding to the magnitude of the voltage applied to the first conductive film 11 and the second conductive film 12 and thereafter emitted from the light modulator 1A as the emission light Lout. In this manner, in a case where the light modulator 1A is the light phase modulator, the phase of the incident light Lin may be modulated to arbitrary magnitude. Then, by arranging such light modulators 1A in a two-dimensional manner, a phase modulation type spatial light modulator (SLM) is realized.

Figure 6A:
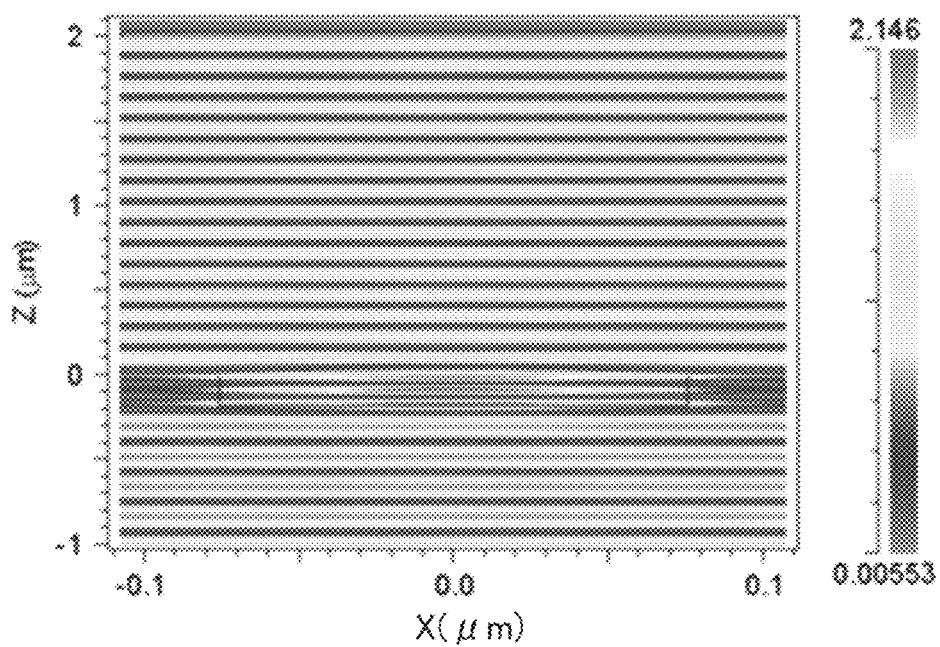
FIGS. 6A and 6B are graphs illustrating a phase change of emission light Lout with respect to incident light Lin when applying a voltage between a first conductive film 11 and a second conductive film 12 to change a refractive index of the first refractive index region 7 within a range of ±0.01.
Figure 6B:
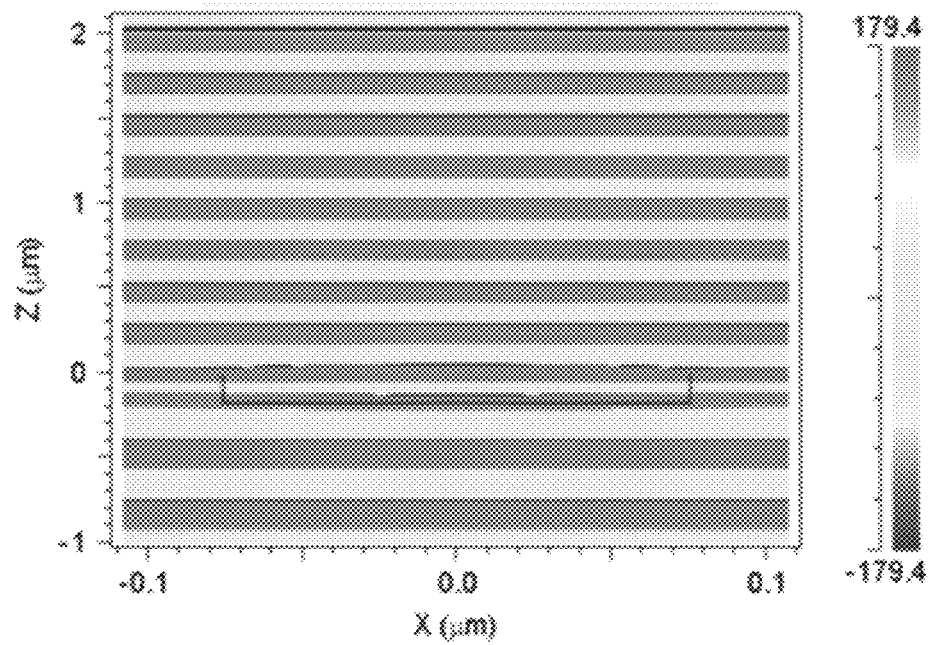
Figure 7A:
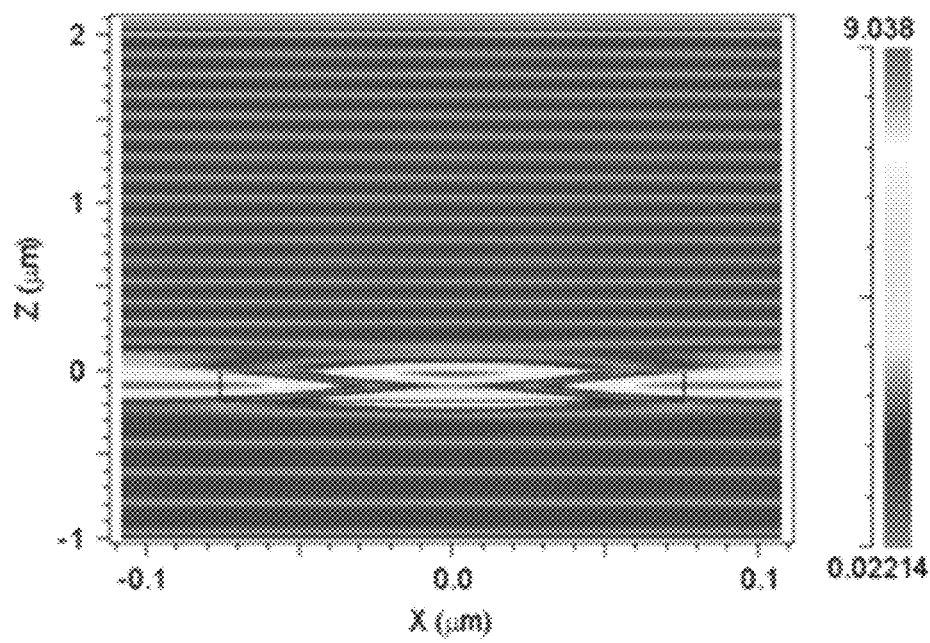
FIGS. 7A and 7B are graphs illustrating the phase change of the emission light Lout with respect to the incident light Lin when applying the voltage between the first conductive film 11 and the second conductive film 12 to change a refractive index of a first refractive index region 7 within a range of ±0.01.
Figure 7B:
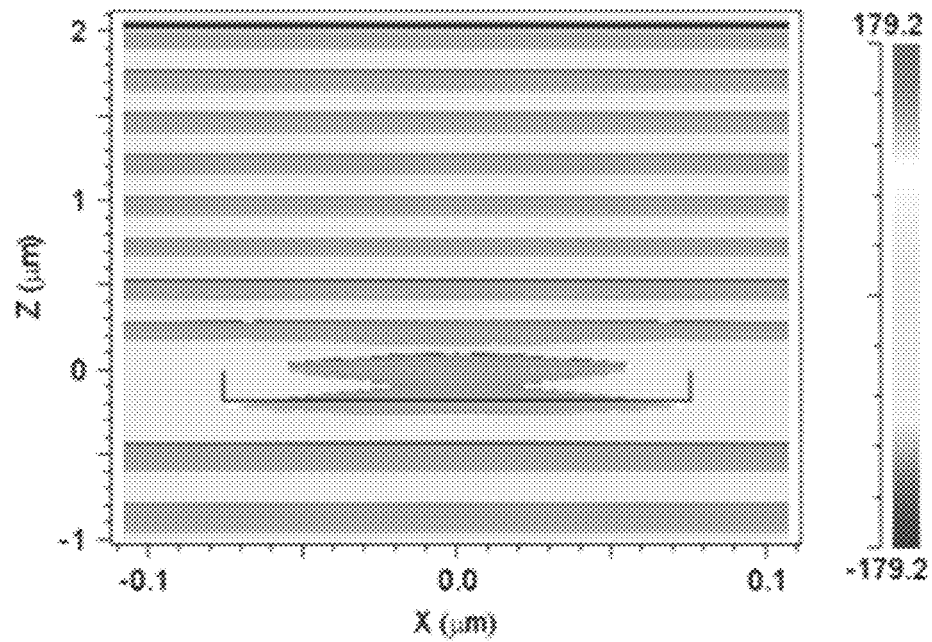
Figure 8A:
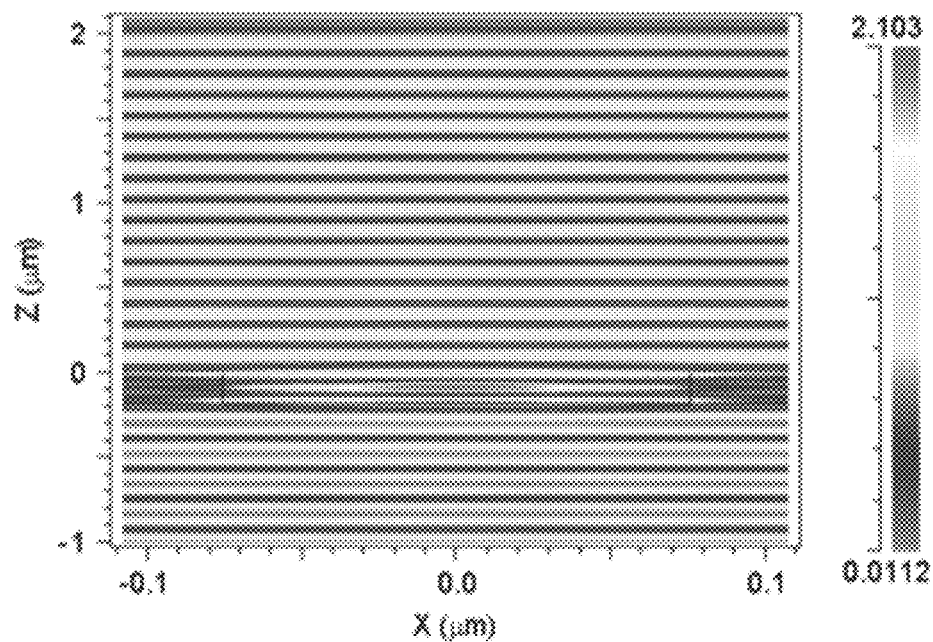
FIGS. 8A and 8B are graphs illustrating the phase change of the emission light Lout with respect to the incident light Lin when applying the voltage between the first conductive film 11 and the second conductive film 12 to change the refractive index of the first refractive index region 7 within a range of ±0.01.
Figure 8B:
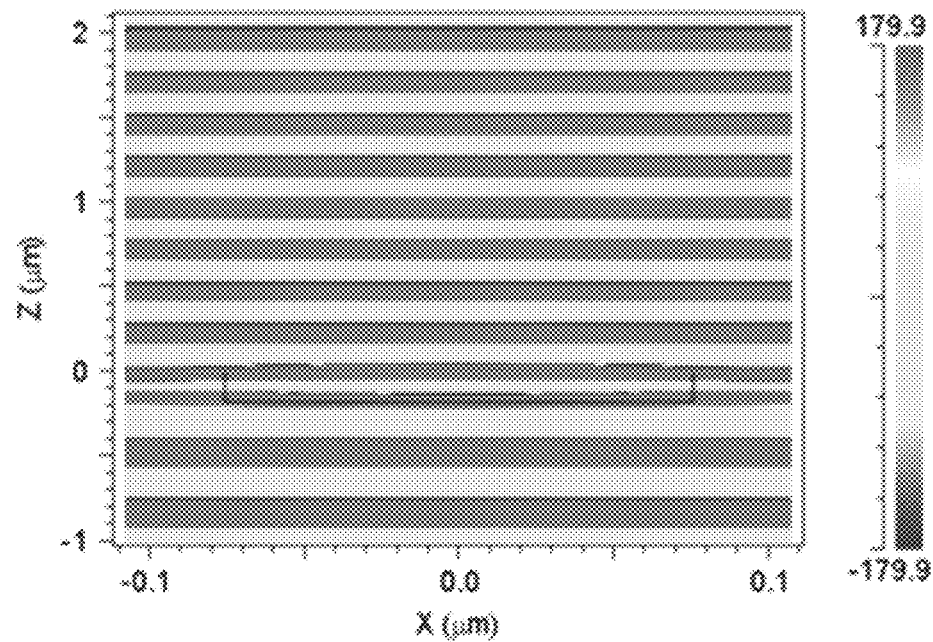

FIGS. 6A to 8B are graphs illustrating a phase change of the emission light Lout with respect to the incident light Lin when applying the voltage between the first conductive film 11 and the second conductive film 12 to change the refractive index of the first refractive index region 7 within a range of ±0.01. Note that FIGS. 6A and 6B illustrate a case where a refractive index change amount is −0.01, FIGS. 7A and 7B illustrate a case where the refractive index change amount is 0, and FIGS. 8A and 8B illustrate a case where the refractive index change amount is +0.01. FIGS. 6A, 7A, and 8A illustrate an amplitude change. FIGS. 6B, 7B, and 8B illustrate the phase change. Magnitude of the value is represented by shade of color. A position in a thickness direction of a device (the incident light Lin is in the position of −1 µm, and the substrate 3 is up to +2 µm) in a case of a unit cell (grating is only one cycle) is plotted along the ordinate, and a position in the predetermined direction D1 of the unit cell is plotted along the abscissa. Note that, in these graphs, the wavelength of the incident light Lin is 355 nm, and the thickness of the low refractive index layer 5 (that is, the distance between the plurality of first refractive index regions 7 and the light reflecting layer 4) is 2 µm. With reference to FIGS. 6A to 8B, in this case, a phase change amount of the emission light Lout with respect to the incident light Lin was about π/6 (rad), that is, 30 degrees.

Note that the light modulator 1A of this embodiment may be used in a wide wavelength range of 290 nm to 5.5 µm by adjusting at least one of the refractive index, thickness, and arrangement pitch of the first refractive index region 7. In this case, laser machining at a wavelength of 355 nm, a wavelength of 532 nm, a wavelength of 1060 nm, or a wavelength of 1064 nm becomes possible. An operation at a wavelength of 1.55 µm used in an optical communication field becomes also possible. A modulation speed is determined by RC time constants of the first conductive film 11 and the second conductive film 12 which are comb-teeth-shaped electrodes, and an operation at several GHz or higher, for example is possible.

Figure 9A:
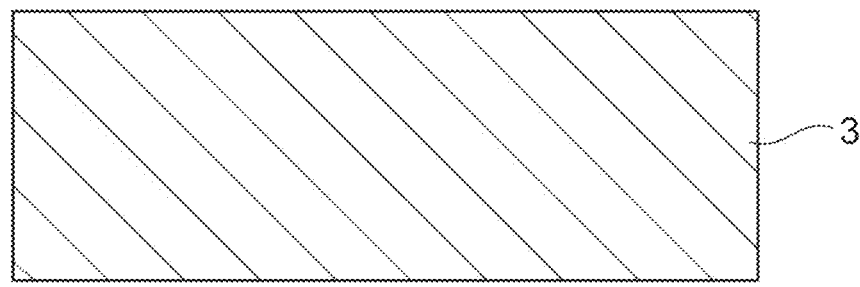
FIGS. 9A to 9C are cross-sectional views illustrating each step in a method of manufacturing the light modulator 1A.
Figure 9B:
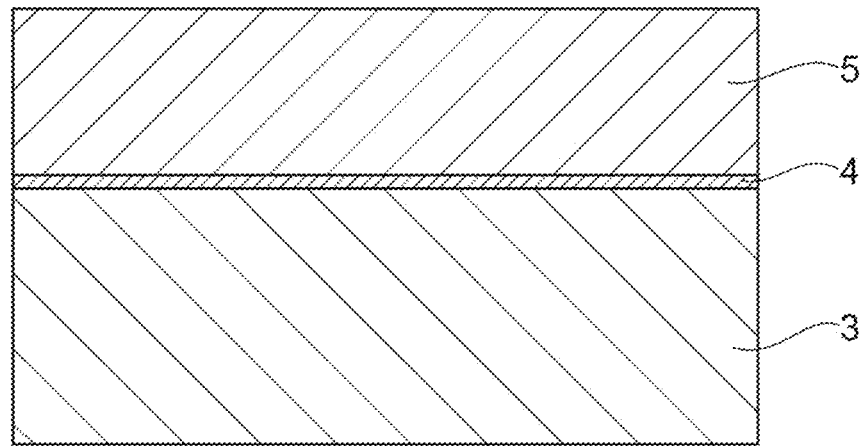
Figure 9C:
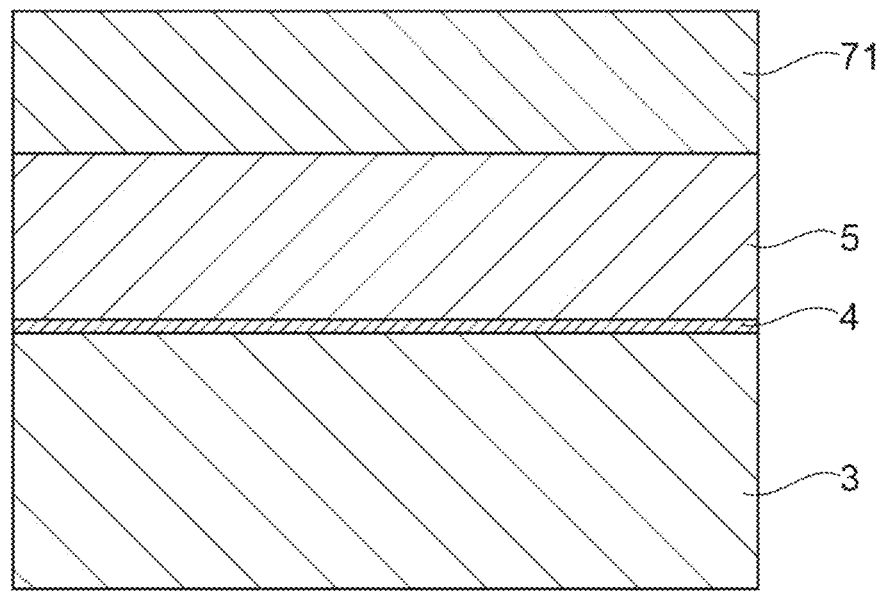

Here, a method of manufacturing the light modulator 1A of this embodiment is described. FIGS. 9A to 11B are cross-sectional views illustrating each step in the method of manufacturing the light modulator 1A. First, as illustrated in FIG. 9A, the substrate 3 is prepared. Details of the substrate 3 are as described above. Next, as illustrated in FIG. 9B, the light reflecting layer 4 is formed on the main surface 3a of the substrate 3 as needed. In a case where the light reflecting layer 4 is constituted by a metal film, the light reflecting layer 4 is formed by, for example, vacuum deposition or a sputtering method. In a case where the light reflecting layer 4 is constituted by a dielectric multilayer film, the light reflecting layer 4 is formed by, for example, vacuum deposition or a sputtering method. After that, the low refractive index layer 5 is formed on the light reflecting layer 4 (or on the main surface 3a of the substrate 3) by a direct bonding method. The low refractive index layer 5 is, for example, a $SiO_2$ layer. Subsequently, the nonlinear optical crystal is modified by irradiating the layer containing the nonlinear optical crystal with He ions. At that time, a position of the layer to be modified is determined depending on an acceleration voltage of He ions. After that, the modified nonlinear optical crystal is further direct-bonded to the layer previously formed by the direct bonding method (refer to FIG. 9B). After that, a modified layer of the nonlinear optical crystal is separated by raising temperature to high temperature, and a layer 71 containing the nonlinear optical crystal illustrated in FIG. 9C is formed. These steps are already known as an ion slicing technology and available abroad as LNOI substrates.

Figure 10A:
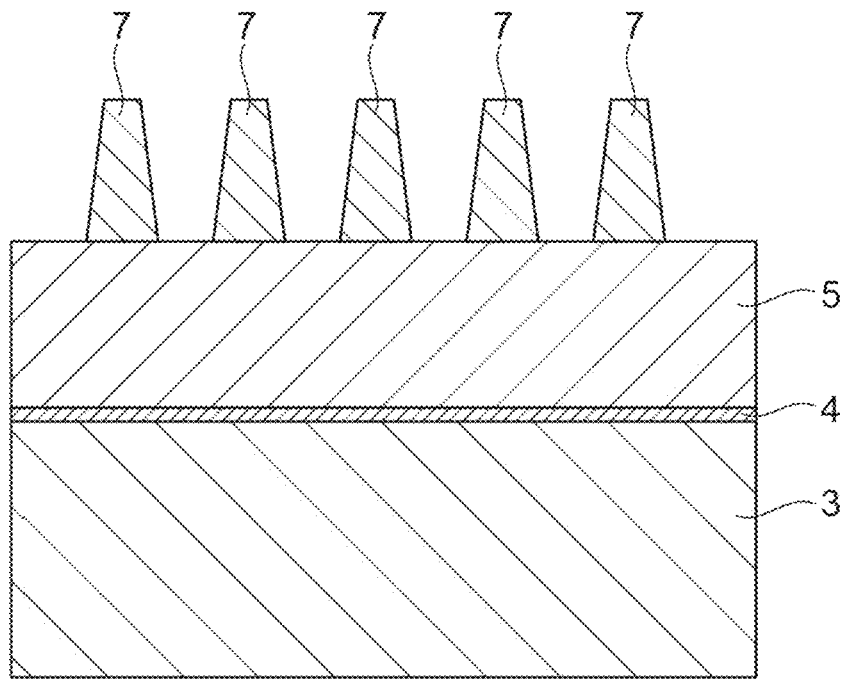
FIGS. 10A and 10B are cross-sectional views illustrating each step in the method of manufacturing the light modulator 1A.

Subsequently, an etching mask by photolithography or electron beam lithography is formed on the layer 71. By etching the layer 71 through the etching mask, the plurality of first refractive index regions 7 is formed as illustrated in FIG. 10A. At that time, a pattern shape of the etching mask corresponds to the planar shape of the plurality of first refractive index regions 7. The etching is performed until the low refractive index layer 5 is exposed, and is stopped at the same time as the low refractive index layer 5 is exposed. The etching is, for example, dry etching. By conditions of the dry etching, the cross-sectional shape of each first refractive index region 7 becomes the rectangular shape.

Figure 10B:
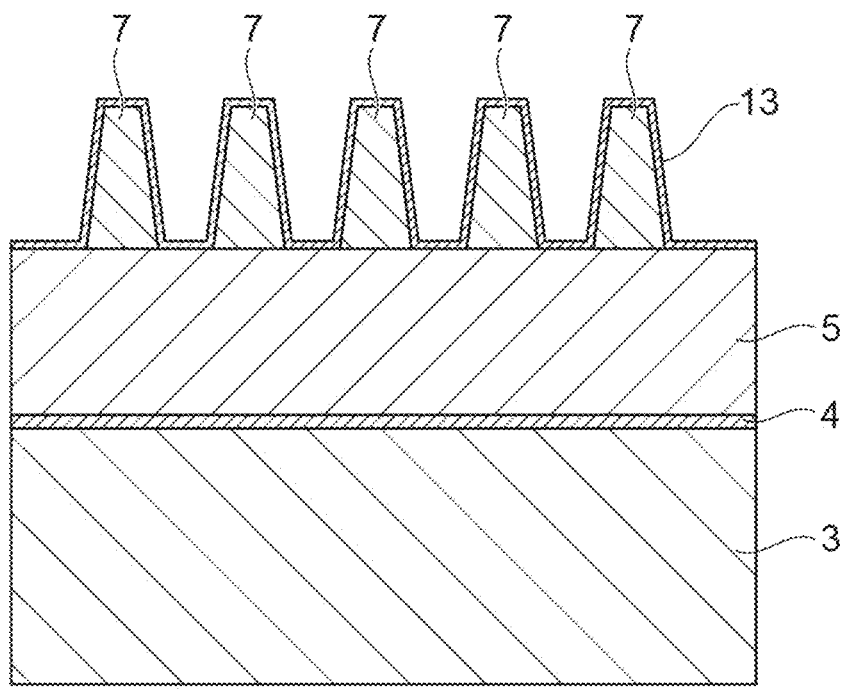

Subsequently, as illustrated in FIG. 10B, a conductive film 13 is deposited on exposed portions (on the side surface and upper surface) of the plurality of first refractive index regions 7 and further on the exposed upper surface of the low refractive index layer 5. A forming material of the conductive film 13 is the same as that of the first conductive film 11 and the second conductive film 12. At that step, the conductive film 13 is formed by a thin film forming method used in a semiconductor process such as an atomic layer deposition (ALD) method, for example.

Figure 11A:
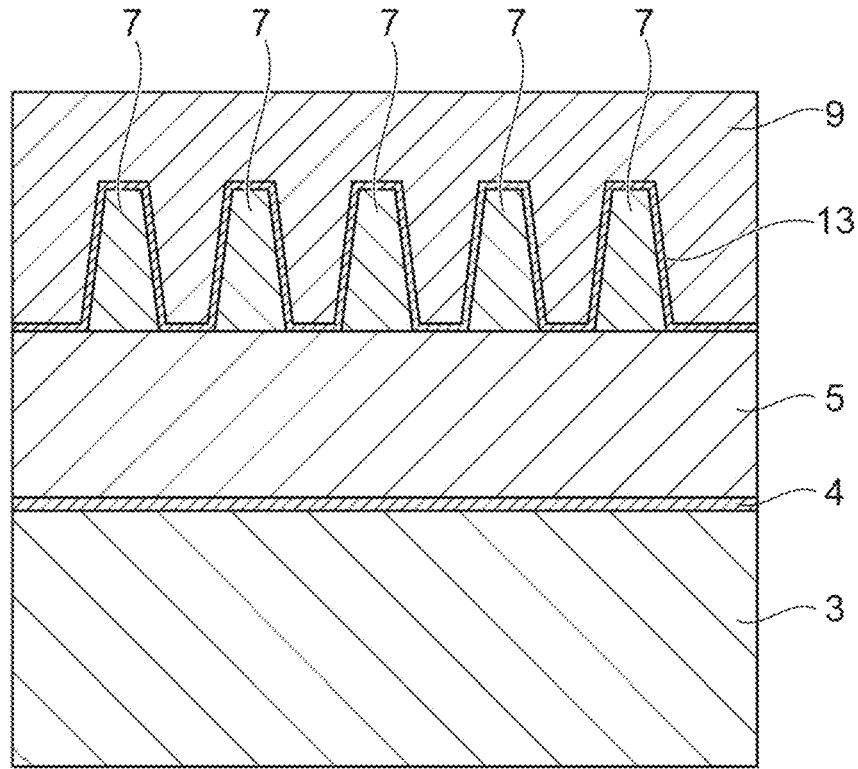
FIGS. 11A and 11B are cross-sectional views illustrating each step in the method of manufacturing the light modulator 1A.

Subsequently, as illustrated in FIG. 11A, a dielectric layer 91 is deposited on the conductive film 13. The dielectric layer 91 is comprised of the same material as that of the plurality of second refractive index regions 9. However, a thickness of the dielectric layer 91 is thicker than that of the plurality of second refractive index regions 9, and this may cover an entire portion including tops of the plurality of first refractive index regions 7. Alternatively, the tops of the plurality of first refractive index regions 7 may be exposed from the dielectric layer 91. At that step, the dielectric layer 91 is formed by, for example, a vacuum deposition method or a sputtering method.

Figure 11B:
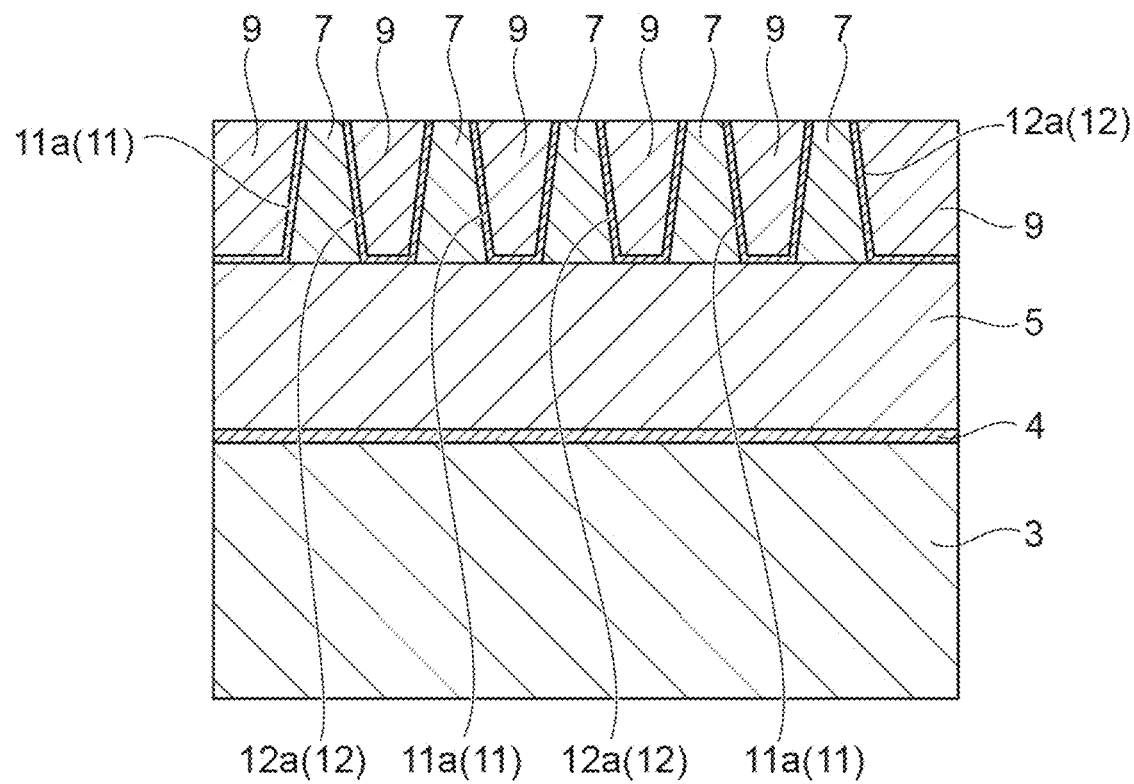

Subsequently, a portion formed on the upper surface of the plurality of first refractive index regions 7 out of the dielectric layer 91 and the conductive film 13 and the tops of the plurality of first refractive index regions 7 are polished. Then, as illustrated in FIG. 11B, the plurality of first refractive index regions 7 is exposed from the conductive film 13. At that step, the dielectric layer 91 is divided and the plurality of second refractive index regions 9 is formed. The conductive film 13 is divided with the first refractive index region 7 interposed therebetween and the first conductive film 11 including the voltage applying unit 11a and the second conductive film 12 including the voltage applying unit 12a are formed. At the above-described steps, the light modulator 1A of this embodiment is manufactured.

An effect obtained by the light modulator 1A of this embodiment described above is described. The above-described modulation operation by the light modulator 1A is realized by the electro-optical effect of a solid nonlinear optical crystal. Then, a response of the nonlinear optical crystal to an input of the voltage signal is remarkably faster than that of a liquid crystal. Therefore, according to the light modulator 1A of this embodiment, a response to an input of a control signal is faster than that in the SLM using the liquid crystal, and high-speed modulation becomes possible.

For example, since resistance of the liquid crystal to high-energy light such as ultraviolet light is low, in a case of the SLM using the liquid crystal, practical use is limited to the wavelength range of 400 nm or longer, for example. On the other hand, resistance of the nonlinear optical crystal to high-energy light such as ultraviolet light is remarkably higher than that of the liquid crystal. Therefore, this embodiment may provide the light modulator 1A especially useful for high energy light such as ultraviolet light. Furthermore, the wavelength of 355 nm corresponds to a third harmonic of a YAG laser, and is considered to be extremely useful for CFRP laser machining application. CFRP is a material use of which in the automobile industry, the aerospace industry and the like is expanding, for example, and it is considered to be desirable to machine CFRP with ultraviolet light in the future.

As in this embodiment, the region between the plurality of first refractive index regions 7 may be filled with the second refractive index region 9 having the refractive index lower than the refractive index of the plurality of first refractive index regions 7. For example, with such a configuration, the low refractive index region may be arranged in a part of the periphery of the plurality of first refractive index regions 7. By filling the gap between the plurality of first refractive index regions 7, it is possible to enhance mechanical strength of the light modulator 1A.

As in this embodiment, the light modulator 1A may be provided with the low refractive index layer 5 in contact with the plurality of first refractive index regions 7 and having the refractive index lower than the refractive index of the plurality of first refractive index regions 7. For example, with such a configuration, the low refractive index region may be arranged in a part of the periphery of the plurality of first refractive index regions 7. The presence of such low refractive index layer 5 makes it easy to form the plurality of first refractive index regions 7 on the layer.

As in this embodiment, the light reflecting layer 4 may include the metal film or dielectric multilayer film. In this case, it becomes possible to easily realize the light reflecting layer 4 having a high reflectance.

As in this embodiment, the first conductive film 11 and the second conductive film 12 may be continuously provided from the portion on the side surface of one of the first refractive index regions 7 adjacent to each other through the portion on the low refractive index layer 5 to the portion on the side surface of the other first refractive index region 7. This configuration facilitates the formation of the first conductive film 11 and the second conductive film 12.

As in this embodiment, the nonlinear optical crystal may contain at least one of lithium niobate and lithium tantalate. Furthermore, the nonlinear optical crystal may contain at least any of cesium lithium borate, β-barium borate, and lithium borate. For example, when the nonlinear optical crystal contains these materials, the action of the light modulator 1A as described above may be preferably obtained. Note that, although the Pockels effect in which the refractive index changes linearly with respect to the applied voltage is used in this embodiment, the Kerr effect in which the refractive index changes quadratically with respect to the applied voltage may also be used.

As in this embodiment, the first conductive film 11 and the second conductive film 12 may have light transmittance. By this, optical loss in the first conductive film 11 and the second conductive film 12 may be reduced, and light incidence/emission efficiency of the light modulator 1A may be improved.

As in this embodiment, the optical distance Z1 between the light reflecting layer 4 and the plurality of first refractive index regions 7 may be the integral multiple of ¼ of the wavelength of the incident light Lin. In this case, since a phase change accompanying a change in applied voltage becomes steep, a phase modulation width may be further expanded. For example, phase modulation with a width of 2π (rad) is also possible.

Figure 12A:
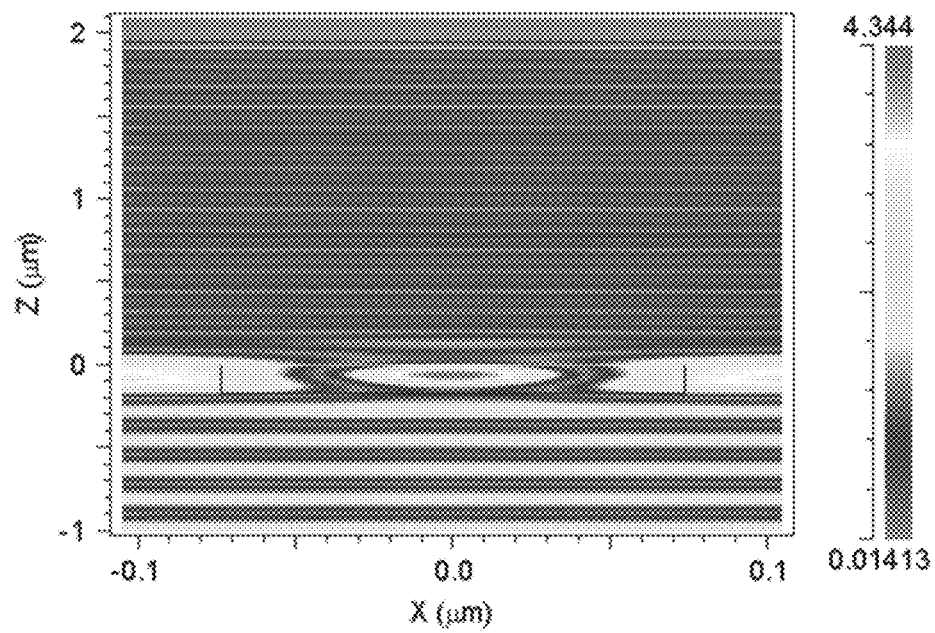
FIGS. 12A and 12B are graphs illustrating the phase change of the emission light Lout with respect to the incident light Lin when a refractive index change amount is −0.01 in an operation of changing the refractive index of the first refractive index region 7 within a range of ±0.01 by applying the voltage between the first conductive film 11 and the second conductive film 12.
Figure 12B:
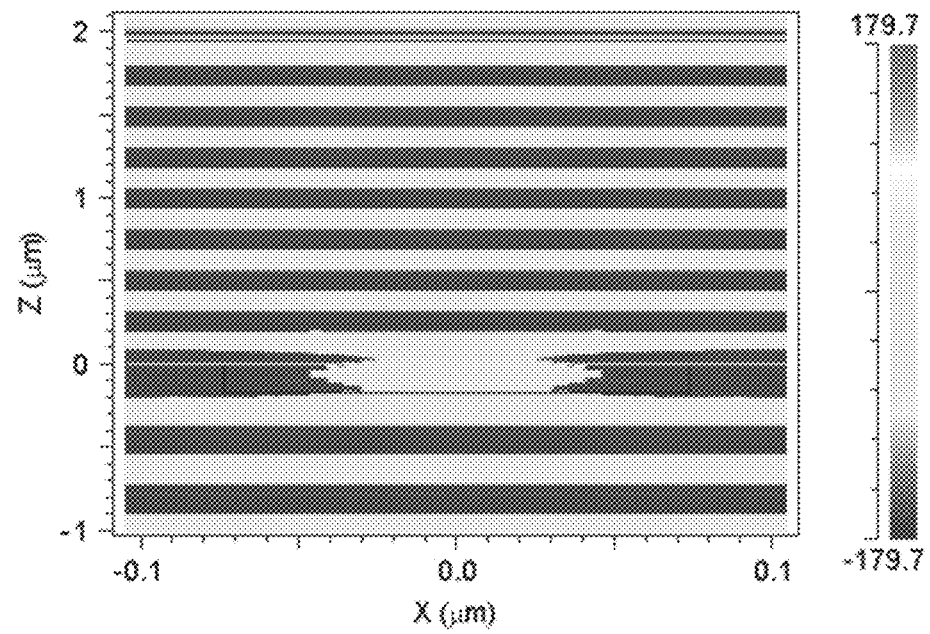
Figure 13A:
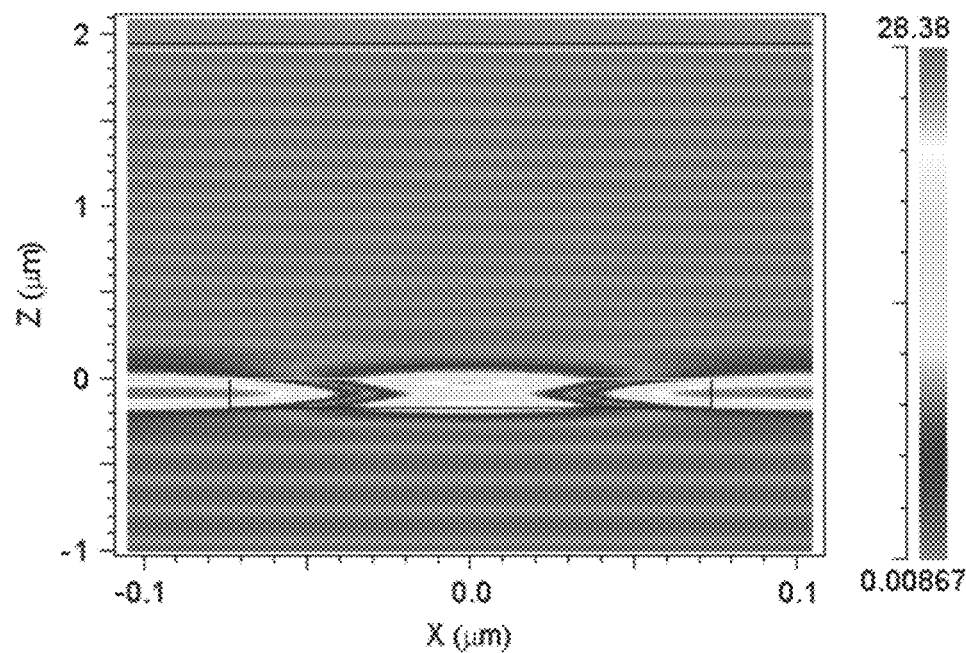
FIGS. 13A and 13B are graphs illustrating the phase change of the emission light Lout with respect to the incident light Lin when the refractive index change amount is 0 in the operation of changing the refractive index of the first refractive index region 7 within the range of ±0.01 by applying the voltage between the first conductive film 11 and the second conductive film 12.
Figure 13B:
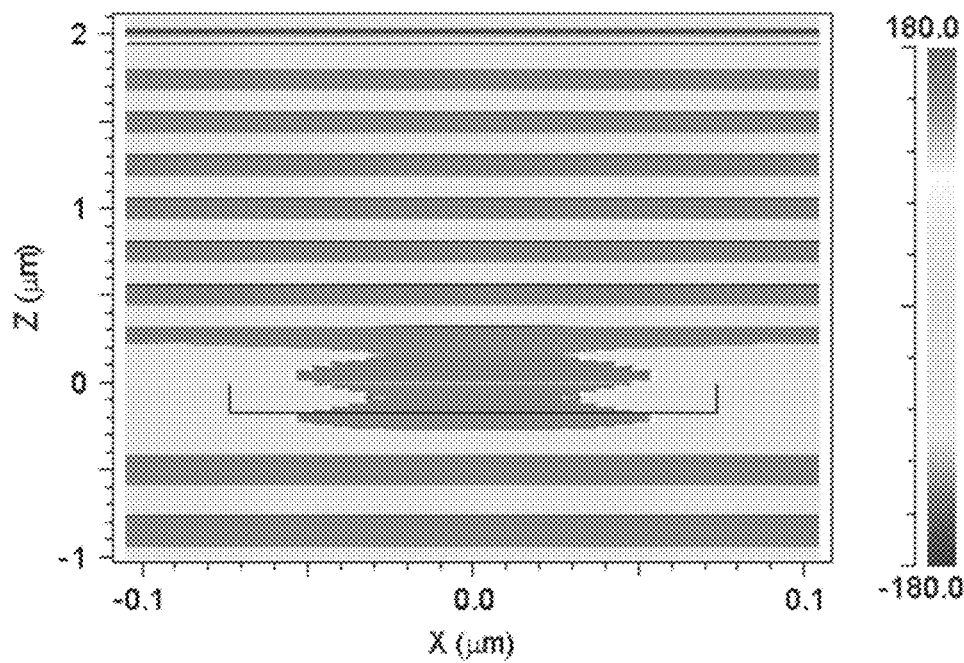
Figure 14A:
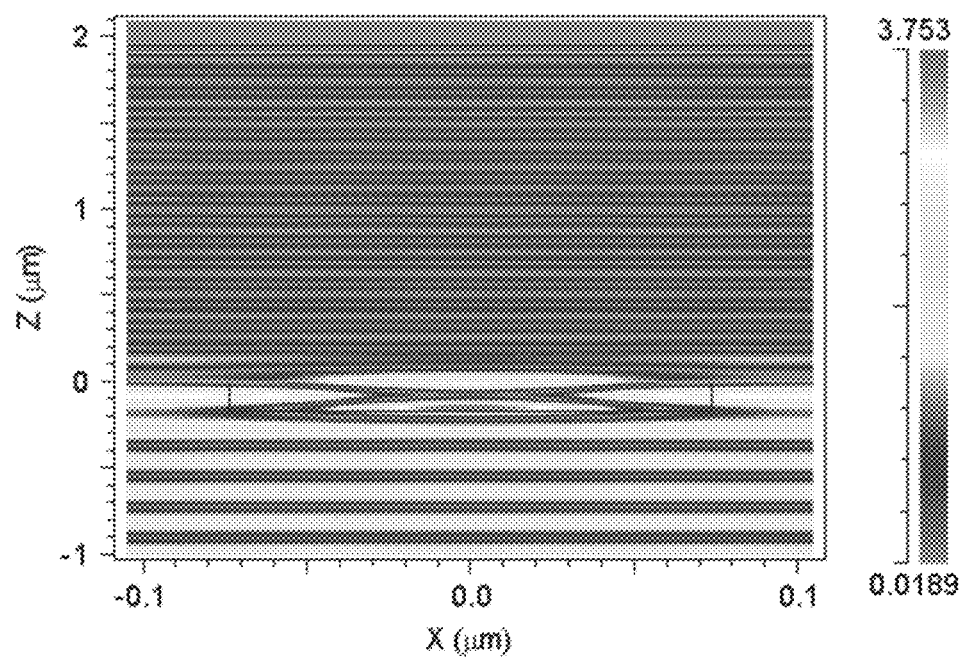
FIGS. 14A and 14B are graphs illustrating the phase change of the emission light Lout with respect to the incident light Lin when the refractive index change amount is +0.01 in the operation of changing the refractive index of the first refractive index region 7 within the range of ±0.01 by applying the voltage between the first conductive film 11 and the second conductive film 12.
Figure 14B:
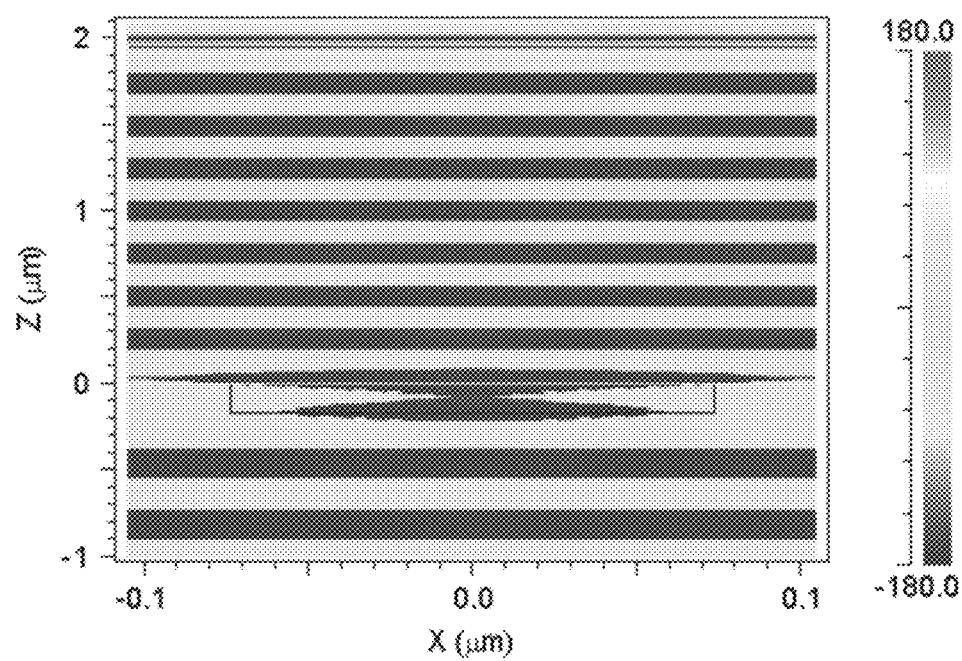

FIGS. 12A to 14B are graphs illustrating the amplitude change and phase change of the emission light Lout with respect to the incident light Lin when applying the voltage between the first conductive film 11 and the second conductive film 12 and change the refractive index of the first refractive index region 7 within a range of ±0.01 while setting the wavelength of the incident light Lin to 355 nm, and the thickness of the low refractive index layer 5 to the integral multiple of ¼ of the wavelength of the incident light Lin (specifically, 1.910 µm). Note that FIGS. 12A and 12B illustrate a case where the refractive index change amount is −0.01, FIGS. 13A and 13B illustrate a case where the refractive index change amount is 0, and FIGS. 14A and 14B illustrate a case where the refractive index change amount is +0.01. FIGS. 12A, 13A, and 14A illustrate the amplitude change in a case where the light modulator 1A is the light intensity modulator. FIGS. 12B, 13B, and 14B illustrate the phase change in a case where the light modulator 1A is the light phase modulator. Magnitude of the value is represented by shade of color. A position in a thickness direction of a device (the incident light Lin is in the position of −1 µm, and the substrate 3 is up to +2 µm) in a case of a unit cell (grating is only one cycle) is plotted along the ordinate, and a position in the predetermined direction D1 of the unit cell is plotted along the abscissa. With reference to FIGS. 12B, 13B, and 14B, it is understood that the phase change amount of the emission light Lout with respect to the incident light Lin may be expanded to 2π (rad), that is, 360 degrees by setting the optical film thickness of the low refractive index layer 5 to the integral multiple of ¼ of the wavelength of the incident light Lin.

Figure 15:
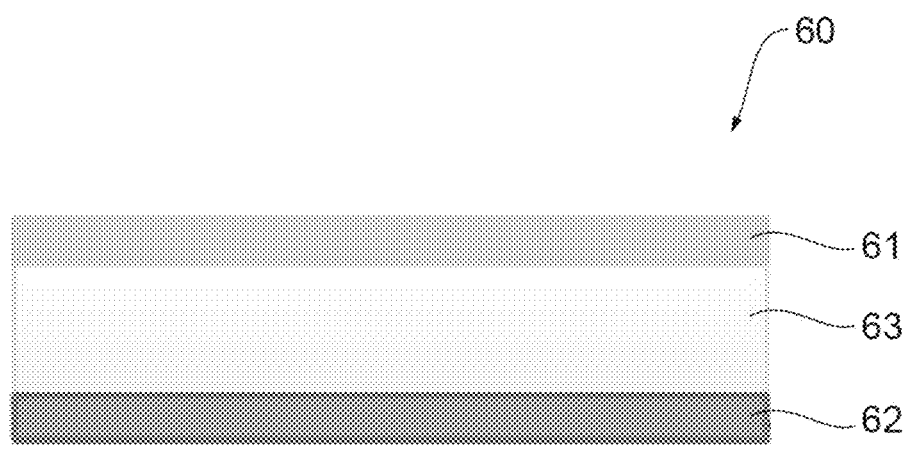
FIG. 15 is a schematic diagram illustrating a non-equilibrium Fabry-Perot resonator structure having a one-dimensional structure.
Figure 16A:
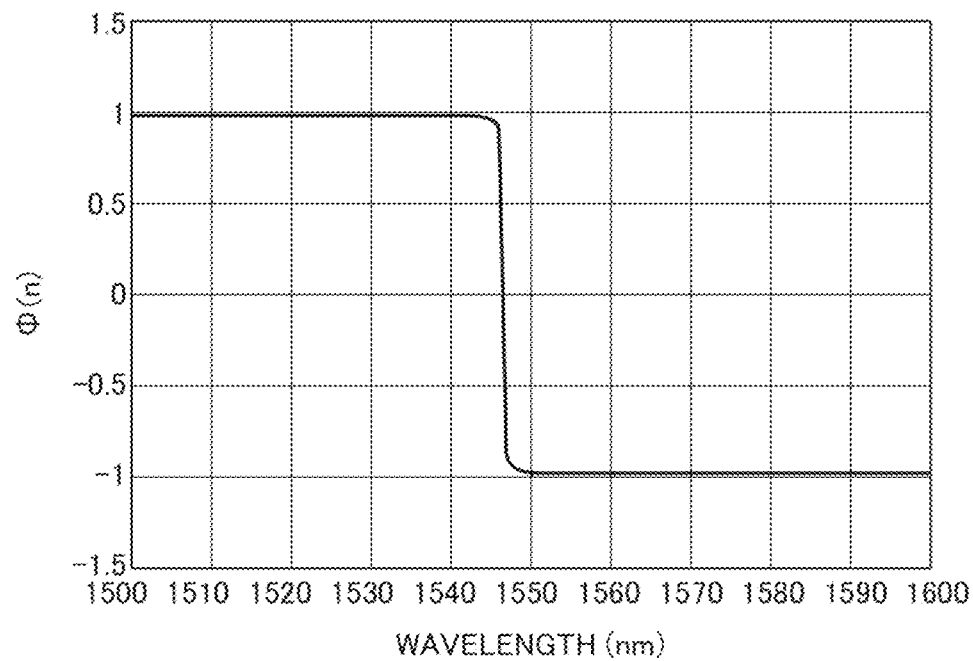
FIGS. 16A and 16B are graphs illustrating a relationship between a wavelength of the incident light Lin and a phase change amount (I).
Figure 16B:
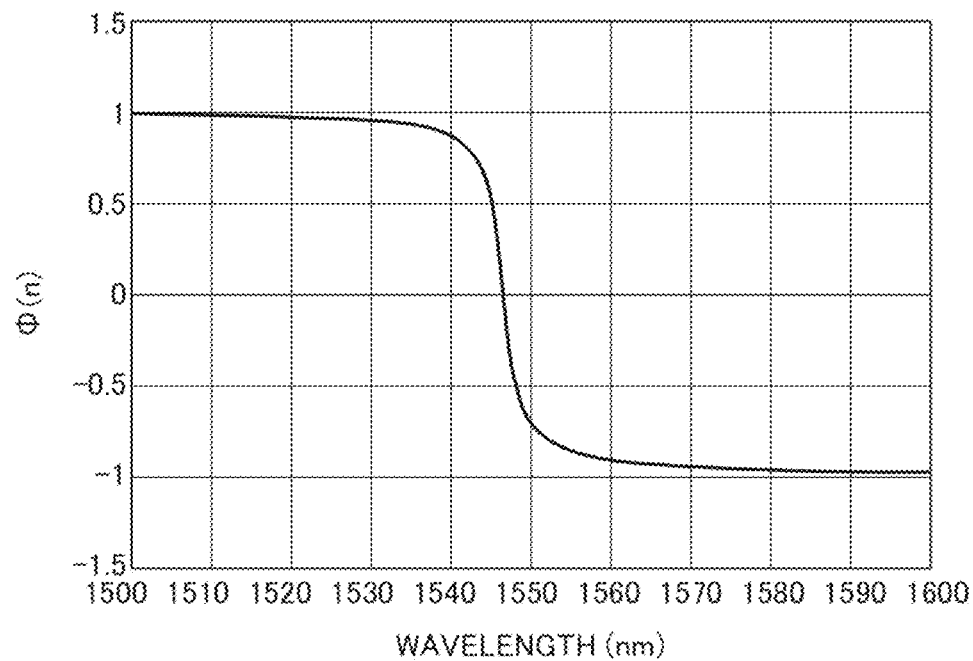

Herein, with reference to FIGS. 15, 16A, and 16B, a principle of the phase change in a case where the light modulator 1A is the light phase modulator is described. FIG. 15 is a schematic diagram illustrating a non-equilibrium Fabry-Perot resonator structure having a one-dimensional structure. The resonator structure 60 is provided with a front surface reflective film 61, a rear surface reflective film 62, and a cavity 63 provided between them. The front surface reflective film 61 corresponds to the grating structure by the first refractive index region 7 and the second refractive index region 9 in this embodiment, and its light reflectance is less than 1. The rear surface reflective film 62 corresponds to the light reflecting layer 4 in this embodiment. FIGS. 16A and 16B are graphs illustrating a relationship between the wavelength of the incident light Lin and a phase change amount (I). Especially, FIG. 16A illustrates a case where the reflectance of the front surface reflective film 61 is set to 0.95, and FIG. 16B illustrates a case where the reflectance of the front surface reflective film 61 is set to 0.90.

As illustrated in FIG. 16A, in a case where the reflectance of the front surface reflective film 61 is high, the phase changes steeply in a certain wavelength region. In a case where the light reflecting layer 4 is provided, a structure has an extremely high reflectance as illustrated in FIGS. 4A and 4B, so that the phase change may be made steep in this manner. The wavelength at which the phase change becomes steep is determined by the thickness (optical film thickness) of the low refractive index layer 5. When a voltage is applied to each first refractive index region 7, the reflectance of the front surface reflective film 61 changes slightly. By this, a characteristic of the grating formed of the plurality of first refractive index regions 7 changes, and the reflectance of the front surface reflective film 61 changes. As a result, the phase may be modulated.

Figure 17:
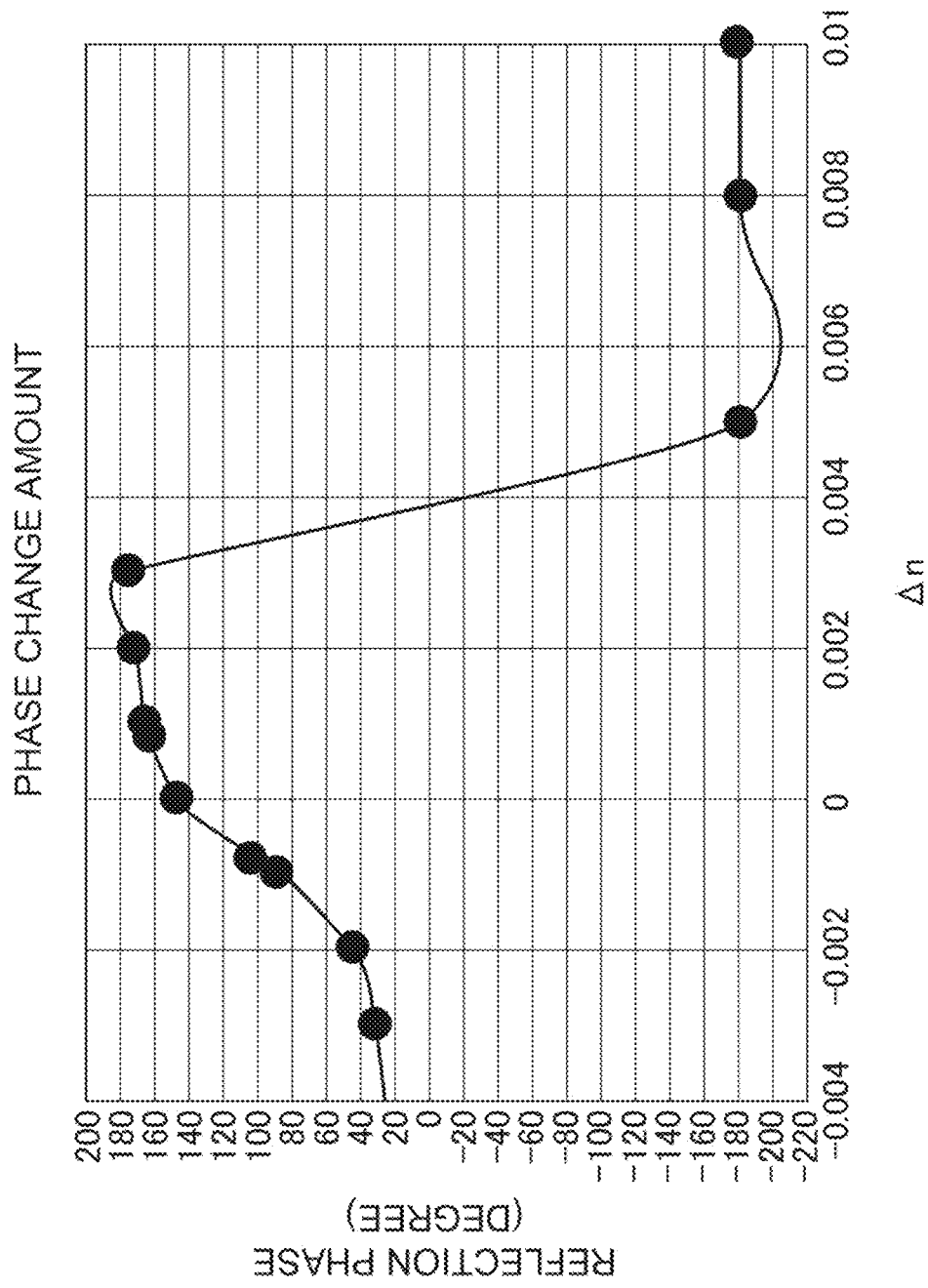
FIG. 17 is a graph illustrating an example of a relationship between a refractive index change amount Δn in each first refractive index region 7 and a phase difference of the emission light Lout with respect to the incident light Lin.

FIG. 17 is a graph illustrating an example of a relationship between a refractive index change amount Δn in each first refractive index region 7 and a phase difference of the emission light Lout with respect to the incident light Lin. Note that, in this graph, the substrate 3 and each first refractive index region 7 are made of $LiTaO_3$, the light reflecting layer 4 is made of Al, and the low refractive index layer 5 is made of $SiO_2$. With reference to FIG. 17, it is understood that a change in phase difference of 360 degrees, that is, 2π (rad) from 180 degrees to −180 degrees may be realized during a slight refractive index change from Δn=0 to Δn=0.005 (corresponding to applied voltage of 3V).

(Variation)

Figure 18:
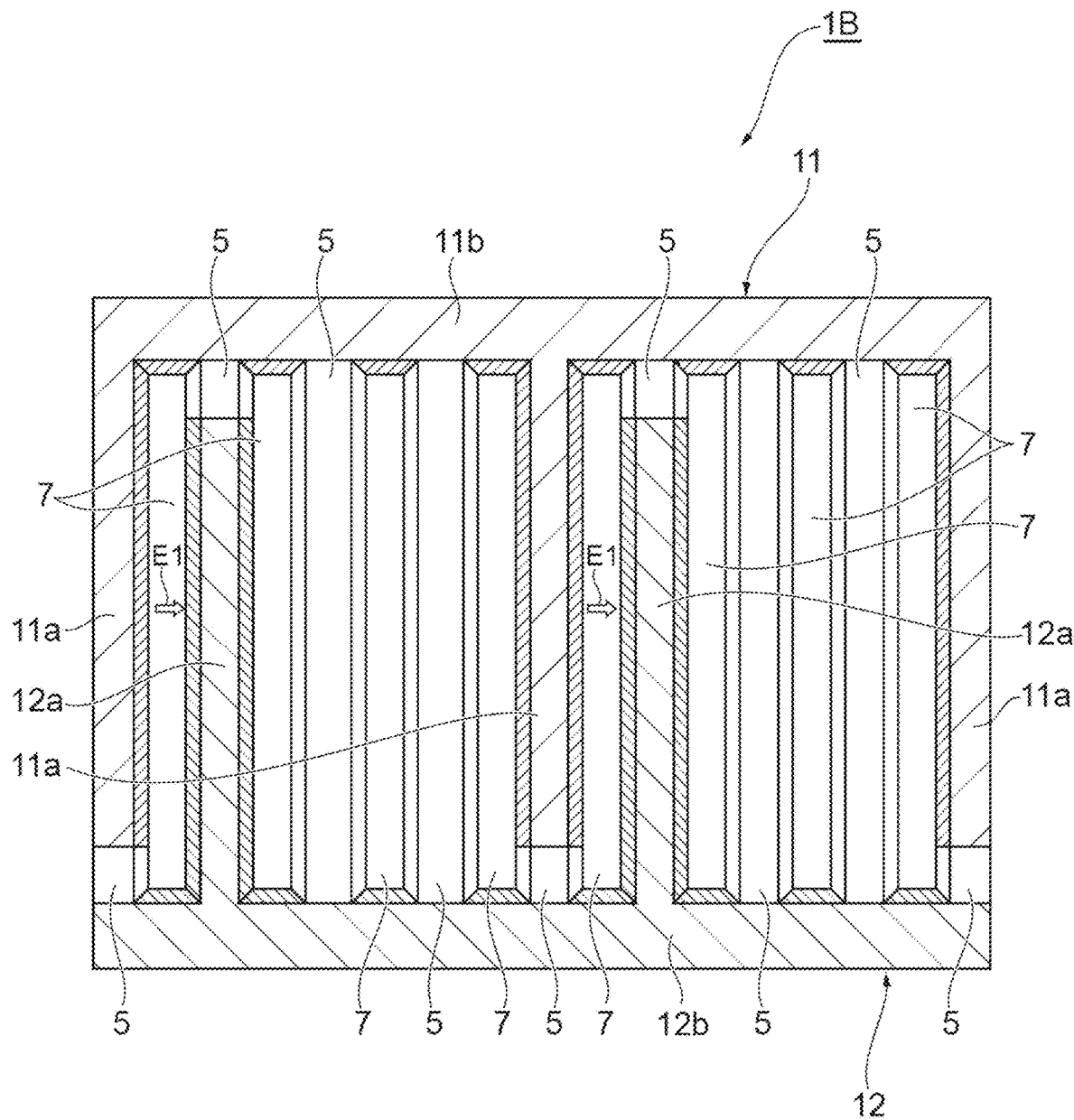
FIG. 18 is a plan view illustrating a light modulator 1B according to a variation.

In the above-described embodiment, either the voltage applying unit 11a of the first conductive film 11 or the voltage applying unit 12a of the second conductive film 12 is provided in all the gaps between the plurality of first refractive index regions 7. However, it is also possible that the voltage applying units 11a and 12a are provided only in a part of the gaps between the plurality of first refractive index regions 7. FIG. 18 is a plan view illustrating a light modulator 1B according to a variation of the above-described embodiment. In this light modulator 1B, voltage applying units 11a and 12a are provided only in a part of gaps between a plurality of first refractive index regions 7. Note that, in the present specification (not limited to the following description), a "side surface" of each first refractive index region 7 means a surface arranged in a predetermined direction D1 in a state of intersecting with the predetermined direction D1, and a surface arranged in a direction D2 in a state of intersecting with the direction D2 (direction orthogonal to the predetermined direction D1) is not included. A group of first refractive index regions in which the voltage applying unit 11a is provided on the side surface is set to a first group, and a group of first refractive index regions 7 in which the voltage applying unit 12a is provided on the side surface is set to a second group. In a specific configuration, there are the first refractive index region 7 provided with the voltage applying units 11a and 12a on both the side surfaces (the first refractive index region belonging to both the first and second groups), one or more first refractive index regions 7 in which one of the voltage applying units 11a and 12a is not provided between the same and another first refractive index region 7 provided with the voltage applying units 11a and 12a on both the side surfaces (the first refractive index region belonging to any one of the first and second groups), and one or more first refractive index regions 7 in which none of the voltage applying units 11a and 12a is provided (the first refractive index region not belonging to either the first or second group). Then, in the first refractive index region 7 provided with the voltage applying units 11a and 12a on both the side surfaces, an arrangement order of the voltage applying units 11a and 12a, that is, a direction of the voltage is the same.

For example, even with such a configuration, the action and effect similar to those in the above-described embodiment may be suitably obtained.

REFERENCE SIGNS LIST 1A, 1B . . . Light modulator; 3 . . . Substrate; 3a . . . Main surface; 3b Rear surface; 4 . . . Light reflecting layer; 5 . . . Low refractive index layer; 7 . . . First refractive index region; 9 . . . Second refractive index region; 11 . . . First conductive film; 11a . . . Voltage applying unit; 11b . . . Connection unit; 12 . . . Second conductive film; 12a . . . Voltage applying unit; 12b . . . Connection unit; 13 . . . Conductive film; 60 . . . Resonator structure; 61 . . . Front surface reflective film; 62 . . . Rear surface reflective film; 63 . . . Cavity; 91 . . . Dielectric layer; D1 . . . Predetermined direction; D2 . . . Direction; E1 . . . Electric field; Lin . . . Incident light; Lout . . . Emission light; and P1 . . . Peak waveform.

The invention claimed is:

1. A light modulator comprising:
a plurality of refractive index regions sequentially arranged on a reference plane at a constant arrangement pitch so as to form a grating in a first direction on the reference plane, the plurality of refractive index regions each containing a nonlinear optical crystal and including a pair of side surfaces sequentially arranged in the first direction in a state of intersecting with the first direction;
a first conductive film provided on any side surface out of the pair of side surfaces in one or more refractive index regions selected from the plurality of refractive index regions and belonging to a first group; and
a second conductive film provided on any side surface out of the pair of side surfaces so as not to overlap with the first conductive film in one or more refractive index regions selected from the plurality of refractive index regions and belonging to a second group,
wherein each of the plurality of refractive index regions is surrounded by a region having a refractive index lower than a refractive index of each of the plurality of refractive index regions, and
the arrangement pitch is set in a range of 150 to 800 nm so that the plurality of refractive index regions function as a sub-wavelength grating with respect to a wavelength of incident light.

2. The light modulator according to claim 1,
wherein at least one refractive index region out of the refractive index regions belonging to the first group belongs to the second group.

3. The light modulator according to claim 1,
wherein, in each of the plurality of refractive index regions, the first conductive film is provided on one of the pair of side surfaces, and
the second conductive film is provided on the other of the pair of side surfaces.

4. The light modulator according to claim 1,
wherein, in the region surrounding each of the plurality of refractive index regions, a material having a refractive index lower than the refractive index of each of the plurality of refractive index regions is embedded.

5. The light modulator according to claim 1, further comprising:
a low refractive index layer in contact with the plurality of refractive index regions so as to sandwich the reference plane, the low refractive index layer having a refractive index lower than the refractive index of each of the plurality of refractive index regions.

6. The light modulator according to claim 5,
wherein, in two refractive index regions adjacent to each other in the first direction out of the plurality of refractive index regions, one of the first conductive film and the second conductive film is continuously provided on side surfaces facing each other of the two adjacent refractive index regions and a part of the low refractive index layer located between the side surfaces facing each other.

7. The light modulator according to claim 1, further comprising:
a light reflecting layer provided in a state separated from the plurality of refractive index regions in a second direction orthogonal to the reference plane in a space on a side opposite to the plurality of refractive index regions across the reference plane.

8. The light modulator according to claim 7,
wherein the light reflecting layer includes a metal film or a dielectric multilayer film.

9. The light modulator according to claim 8,
wherein an optical distance defined in the second direction, the optical distance between the light reflecting layer and the plurality of refractive index regions is an integral multiple of ¼ of a wavelength of incident light.

10. The light modulator according to claim 7,
wherein an optical distance defined in the second direction, the optical distance between the light reflecting layer and the plurality of refractive index regions is an integral multiple of ¼ of a wavelength of incident light.

11. The light modulator according to claim 1,
wherein the nonlinear optical crystal contains at least one of lithium niobate and lithium tantalate.

12. The light modulator according to claim 1,
wherein the nonlinear optical crystal contains at least any of cesium lithium borate, β-barium borate, and lithium borate.

13. The light modulator according to claim 1,
wherein each of the first conductive film and the second conductive film has light transmittance.

14. The light modulator according to claim 1,
wherein the region surrounding the plurality of refractive index regions is comprised of an insulating inorganic material other than the nonlinear optical crystal.

* * * * *